United States Patent
Tokuchi

(10) Patent No.: US 11,361,356 B2
(45) Date of Patent: Jun. 14, 2022

(54) APPARATUS, MANAGEMENT SYSTEM, AND NON-TRANSITORY COMPUTER READABLE MEDIUM

(71) Applicant: FUJIFILM Business Innovation Corp., Tokyo (JP)

(72) Inventor: Kengo Tokuchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 54 days.

(21) Appl. No.: 16/111,224

(22) Filed: Aug. 24, 2018

(65) Prior Publication Data

US 2019/0130467 A1     May 2, 2019

(30) Foreign Application Priority Data

Oct. 26, 2017  (JP) .............................. JP2017-207332

(51) Int. Cl.
*G06Q 30/00* (2012.01)
*G06Q 30/06* (2012.01)
*G06F 16/2457* (2019.01)

(52) U.S. Cl.
CPC ... *G06Q 30/0625* (2013.01); *G06F 16/24578* (2019.01); *G06Q 30/0605* (2013.01); *G06Q 30/0631* (2013.01)

(58) Field of Classification Search
None
See application file for complete search history.

(56) References Cited

U.S. PATENT DOCUMENTS

| | | | | |
|---|---|---|---|---|
| 5,311,425 A | * | 5/1994 | Inada | G06Q 10/025 705/6 |
| 5,864,818 A | * | 1/1999 | Feldman | G06Q 10/02 705/5 |
| 6,329,919 B1 | * | 12/2001 | Boies | G06Q 10/02 340/4.6 |
| 6,658,390 B1 | * | 12/2003 | Walker | G06Q 10/02 705/15 |
| 7,246,072 B2 | * | 7/2007 | Walker | G06Q 10/02 705/5 |
| 7,535,367 B2 | * | 5/2009 | Ratnakar | G06Q 10/02 340/573.1 |
| 9,965,938 B1 | * | 5/2018 | Cronin | H04W 4/029 |

(Continued)

FOREIGN PATENT DOCUMENTS

| | | |
|---|---|---|
| JP | 2002073654 | 3/2002 |
| JP | 2002074122 | 3/2002 |

(Continued)

OTHER PUBLICATIONS

Tara Morales "Increasing Direct Booking in Hotels" Haaga-Helia, University of Applied Sciences (Year: 2017).*

(Continued)

*Primary Examiner* — Naeem U Haq
(74) *Attorney, Agent, or Firm* — JCIPRNET

(57) ABSTRACT

An apparatus includes a presenter. The presenter presents, as an option, a first product to be provided by a first provider to a user. The first provider is a provider accessed by the user. The presenter presents, as an option, a second product to be provided by a predetermined second provider to the user if it is not possible to provide the first product.

18 Claims, 21 Drawing Sheets

(56) References Cited

U.S. PATENT DOCUMENTS

| | | | |
|---|---|---|---|
| 2002/0156700 A1* | 10/2002 | Gray | G06Q 30/02 |
| | | | 705/27.1 |
| 2004/0103025 A1* | 5/2004 | Ulf | G06Q 30/0207 |
| | | | 705/14.1 |
| 2008/0046298 A1* | 2/2008 | Ben-Yehuda | G06Q 10/109 |
| | | | 705/6 |
| 2011/0106441 A1* | 5/2011 | Robinson | G06F 16/951 |
| | | | 701/532 |
| 2014/0129265 A1* | 5/2014 | Arena | G06Q 50/14 |
| | | | 705/5 |
| 2016/0078374 A1* | 3/2016 | Lippow | G06F 3/04842 |
| | | | 705/5 |
| 2020/0065349 A1* | 2/2020 | Kurosawa | G06F 16/9535 |

FOREIGN PATENT DOCUMENTS

| | | |
|---|---|---|
| JP | 2002-150178 | 5/2002 |
| JP | 2004-086582 | 3/2004 |
| JP | 2004-199417 | 7/2004 |
| JP | 2005327193 | 11/2005 |

OTHER PUBLICATIONS

"Office Action of Japan Counterpart Application", dated Aug. 24, 2021, with English translation thereof, p. 1-p. 6.

Office Action of Japan Counterpart Application, with English translation thereof, dated Mar. 1, 2022, pp. 1-5.

* cited by examiner

| | | | | | |
|---|---|---|---|---|---|
| 151 | SPACE MANAGED BY COMPANY A (SPACE SELECTED BY USER) | A#05002 | A#18023 | A#01255 | ... |
| 152 | MANAGEMENT COMPANY | A | A | A | |
| 153 | LINKED SPACE OF PARTNER OPERATOR | B#20556 | B#03689 | C#12384 | |
| 154 | MANAGEMENT COMPANY OF LINKED SPACE | B | B | C | |
| 155 | DISTANCE (TIME) | ◎ | △ | ○ | |
| 156 | TRANSPORTATION COST | ○ | × | △ | |
| 157 | EXTENDABLE TIME | × | △ | ○ | |
| 158 | FACILITIES | ◎ | ○ | △ | |
| | ⋮ | | | | |
| 159 | MATCHING DEGREE | THIRD | FIFTH | FIRST | |
| 160 | ARRANGEMENT FEE TO COMPANY A | 600 YEN | 600 YEN | 400 YEN | |
| 161 | REWARD FEE TO USER | 100 YEN | 200 YEN | 150 YEN | |

150

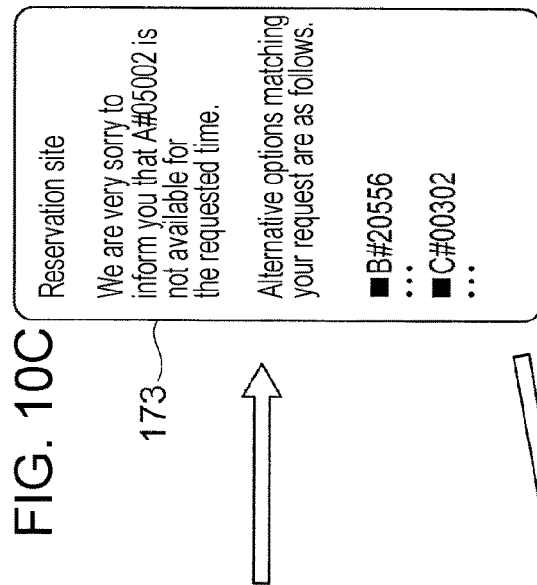
FIG. 10A
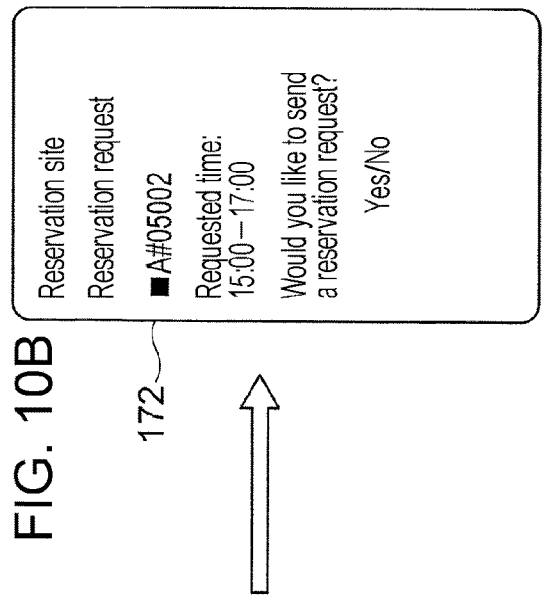
FIG. 10B
FIG. 10C
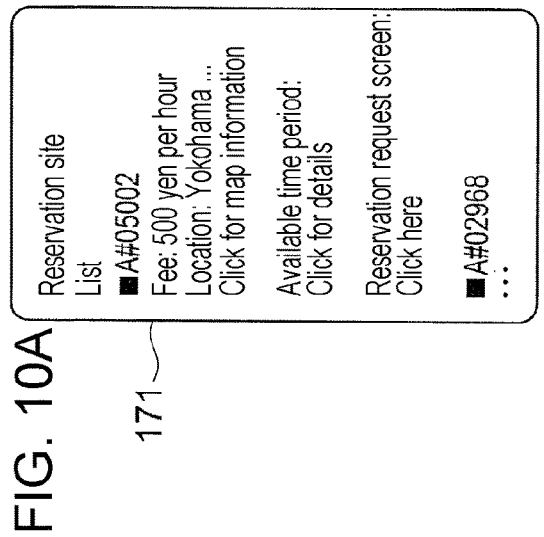
FIG. 10D
FIG. 10E
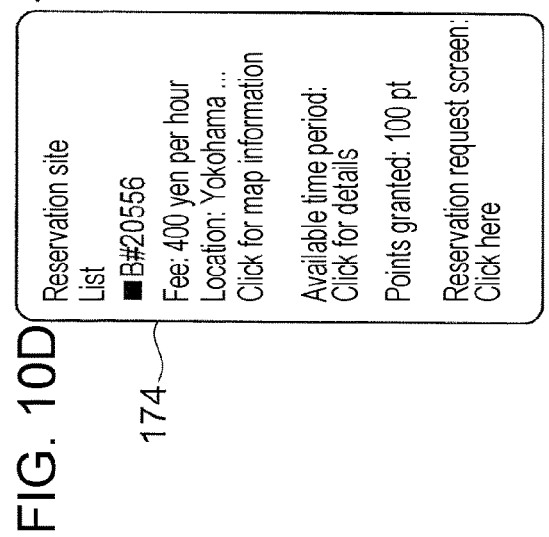
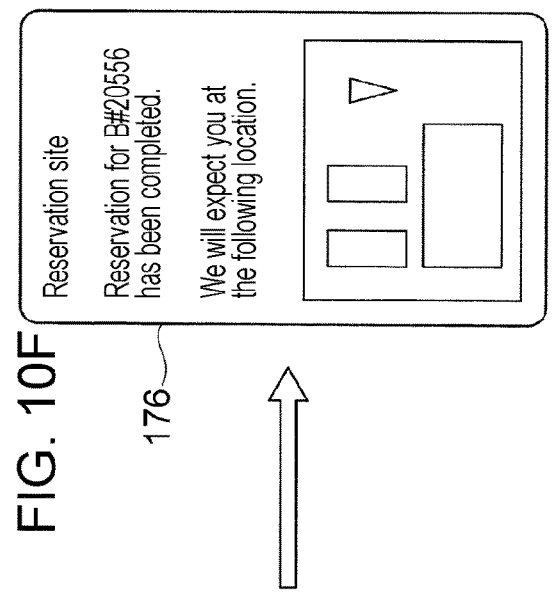
FIG. 10F

FIG. 14

| | | | | |
|---|---|---|---|---|
| 191 — SALES COMPANY FIRST ACCESSED BY USER | COMPANY A1 | COMPANY B1 | ... | |
| 192 — LINKED SALES COMPANY | COMPANY B1 | COMPANY A1 | | |
| 193 — SCHEDULED DELIVERY DATE OR TIME | ◎ | △ | | |
| 194 — TOTAL PRICE | ○ | × | | |
| 195 — PRODUCT CONDITION | ○ | × | | |
| 196 — REPUTATION | ○ | △ | | |
| 197 — PORTAL-SITE OPERATOR ASSOCIATED WITH SALES COMPANY | - | G | | |
| 198 — PORTAL-SITE OPERATOR ASSOCIATED WITH LINKED SALES COMPANY | G | - | | |
| 199 — ARRANGEMENT FEE TO SALES COMPANY | 100 YEN | 100 YEN | | |
| 200 — ARRANGEMENT FEE TO PORTAL-SITE OPERATOR | 200 YEN | - | | |
| 201 — REWARD FEE TO USER | 100 YEN | 200 YEN | | |

190

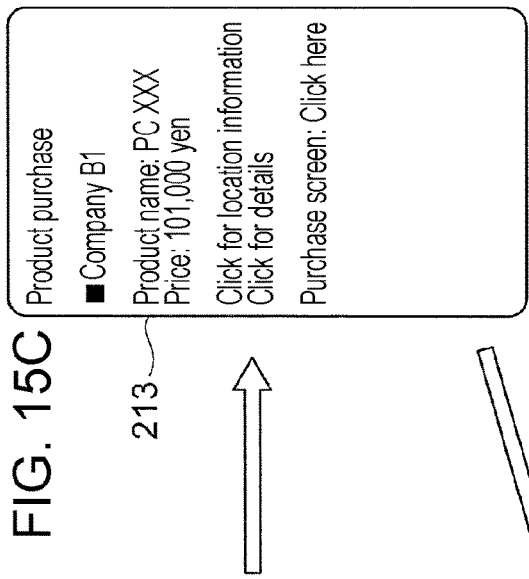
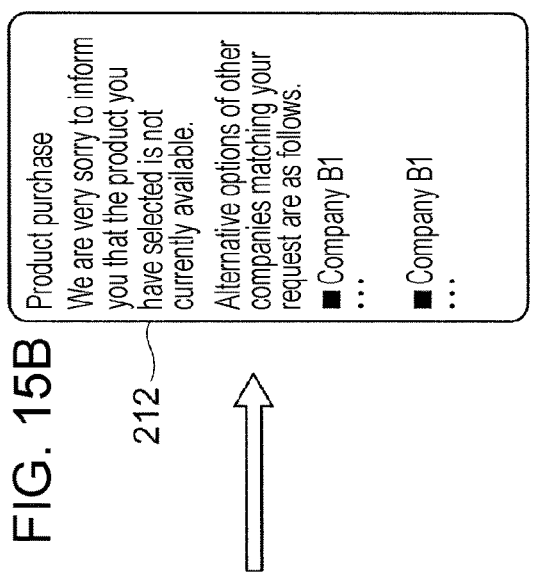
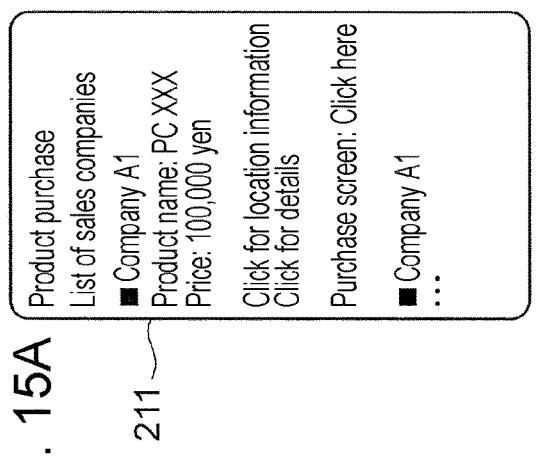
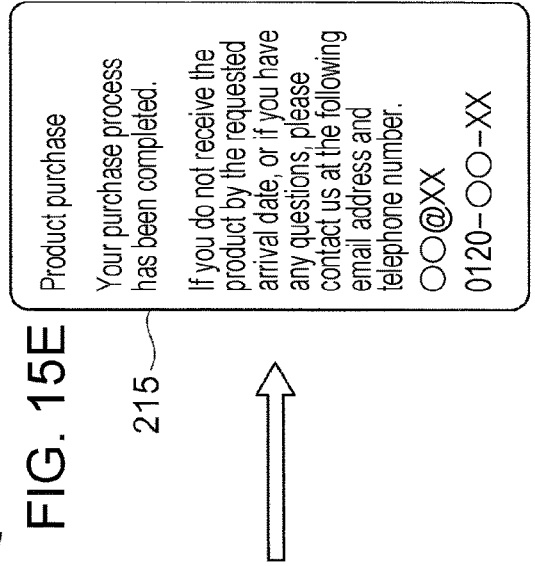
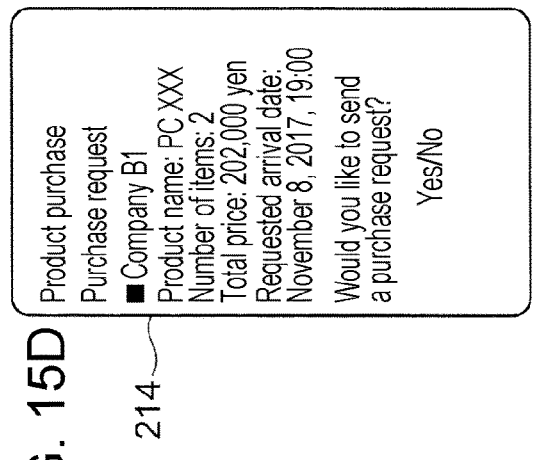

| | | | | |
|---|---|---|---|---|
| 231 | SERVICE PROVIDING COMPANY FIRST ACCESSED BY USER | COMPANY A2 | COMPANY B2 | ... |
| 232 | LINKED SERVICE PROVIDING COMPANY | COMPANY B2 | COMPANY A2 | |
| 233 | PROVIDING DATE OR TIME | ◎ | △ | |
| 234 | PRICE | ○ | × | |
| 235 | REPUTATION | ○ | × | |
| 236 | DISTANCE OR TIME | ○ | ◎ | |
| 237 | PORTAL-SITE OPERATOR ASSOCIATED WITH SERVICE PROVIDING COMPANY | - | G | |
| 238 | PORTAL-SITE OPERATOR ASSOCIATED WITH LINKED SERVICE PROVIDING COMPANY | H | - | |
| 239 | ARRANGEMENT FEE TO SERVICE PROVIDING COMPANY | 100 YEN | 100 YEN | |
| 240 | ARRANGEMENT FEE TO PORTAL-SITE OPERATOR | 200 YEN | - | |
| 241 | REWARD FEE TO USER | 100 YEN | 200 YEN | |

230

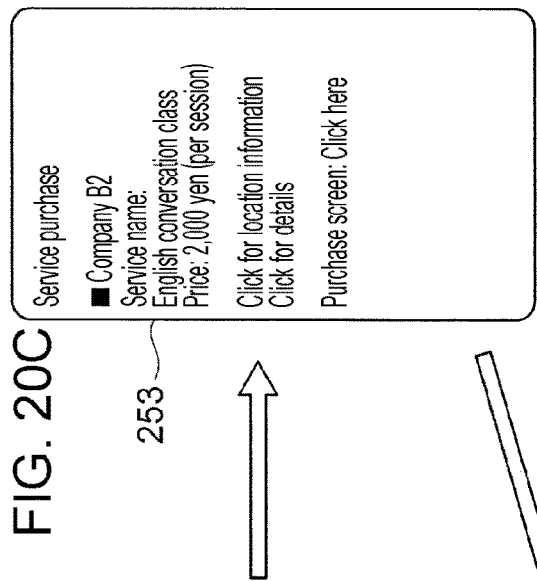
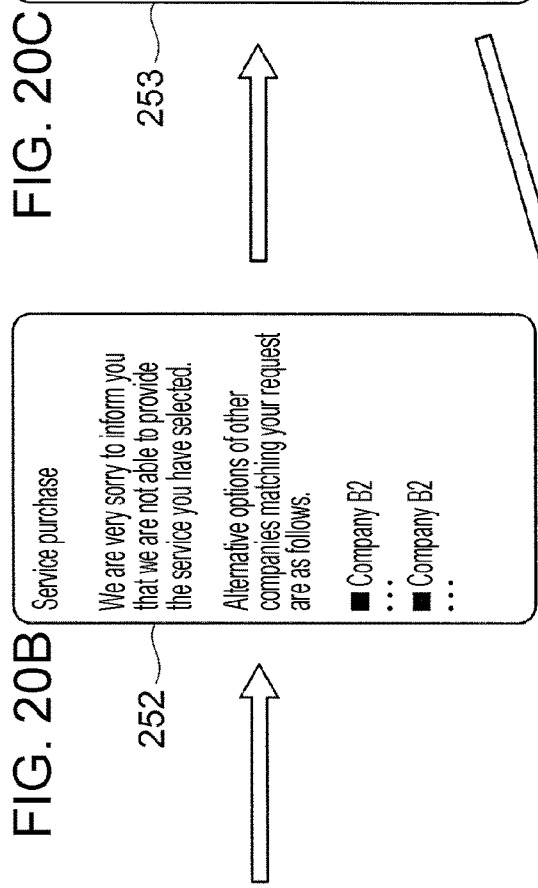
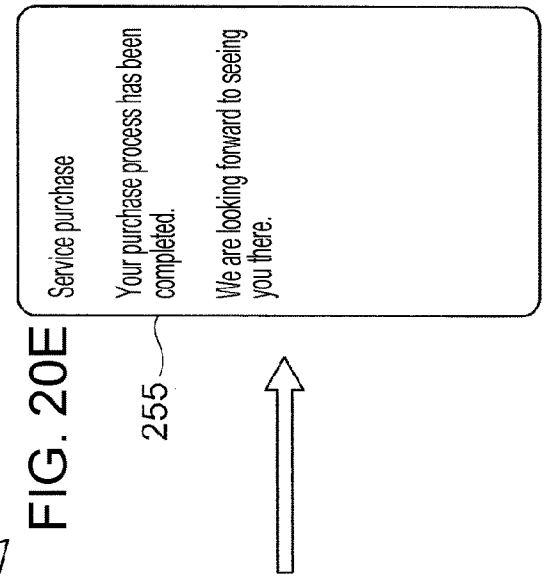
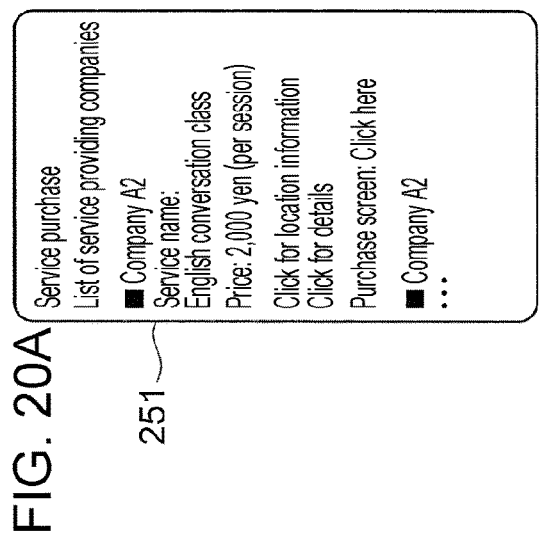
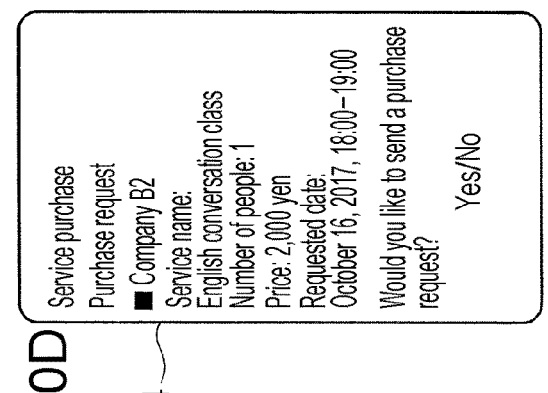

APPARATUS, MANAGEMENT SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-207332 filed Oct. 26, 2017.

BACKGROUND

(i) Technical Field

The present invention relates to an apparatus, a management system, and a non-transitory computer readable medium.

(ii) Related Art

A search is conducted for products (including services and information), and products that match a search condition are presented as a search result. For example, a search is broadly conducted for products provided by multiple providers, and a user is encouraged to purchase a product from a specific provider that provides the product that matches a search condition.

SUMMARY

According to an aspect of the invention, there is provided an apparatus including a presenter. The presenter presents, as an option, a first product to be provided by a first provider to a user. The first provider is a provider accessed by the user. The presenter presents, as an option, a second product to be provided by a predetermined second provider to the user if it is not possible to provide the first product.

BRIEF DESCRIPTION OF THE DRAWINGS

Exemplary embodiments of the present invention will be described in detail based on the following figures, wherein:

FIG. 9 illustrates an example of a management table referred to by the reservation controller;

FIGS. 10A through 10F illustrate examples of screens displayed during a reservation process;

FIG. 14 illustrates an example of a management table referred to by the sales controller;

FIGS. 15A through 15E illustrate examples of screens displayed during a process of purchasing a product;

FIG. 19 illustrates an example of a management table referred to by the service providing controller;

FIGS. 20A through 20E illustrate examples of screens displayed during a process of purchasing a service.

DETAILED DESCRIPTION

Exemplary embodiments of the invention will be described below with reference to the accompanying drawings.

In the following exemplary embodiments, goods, services, information to be provided to users may be called products.

In the following exemplary embodiments, products are charged products. However, products may be provided free or in exchange of digital points.

First Exemplary Embodiment

[Overall Configuration of Management System]

Due to the increased communication speed and smaller communication terminals, users can now access various items of information even outside the office. On the other hand, however, business conversations and information are highly confidential, and quiet and high-security environments are desirably provided.

In the first exemplary embodiment, a management system for providing spaces that satisfy such a demand will be described. Spaces, which will be described below, are not restricted for business use, but may also be for personal use.

Figure 1:
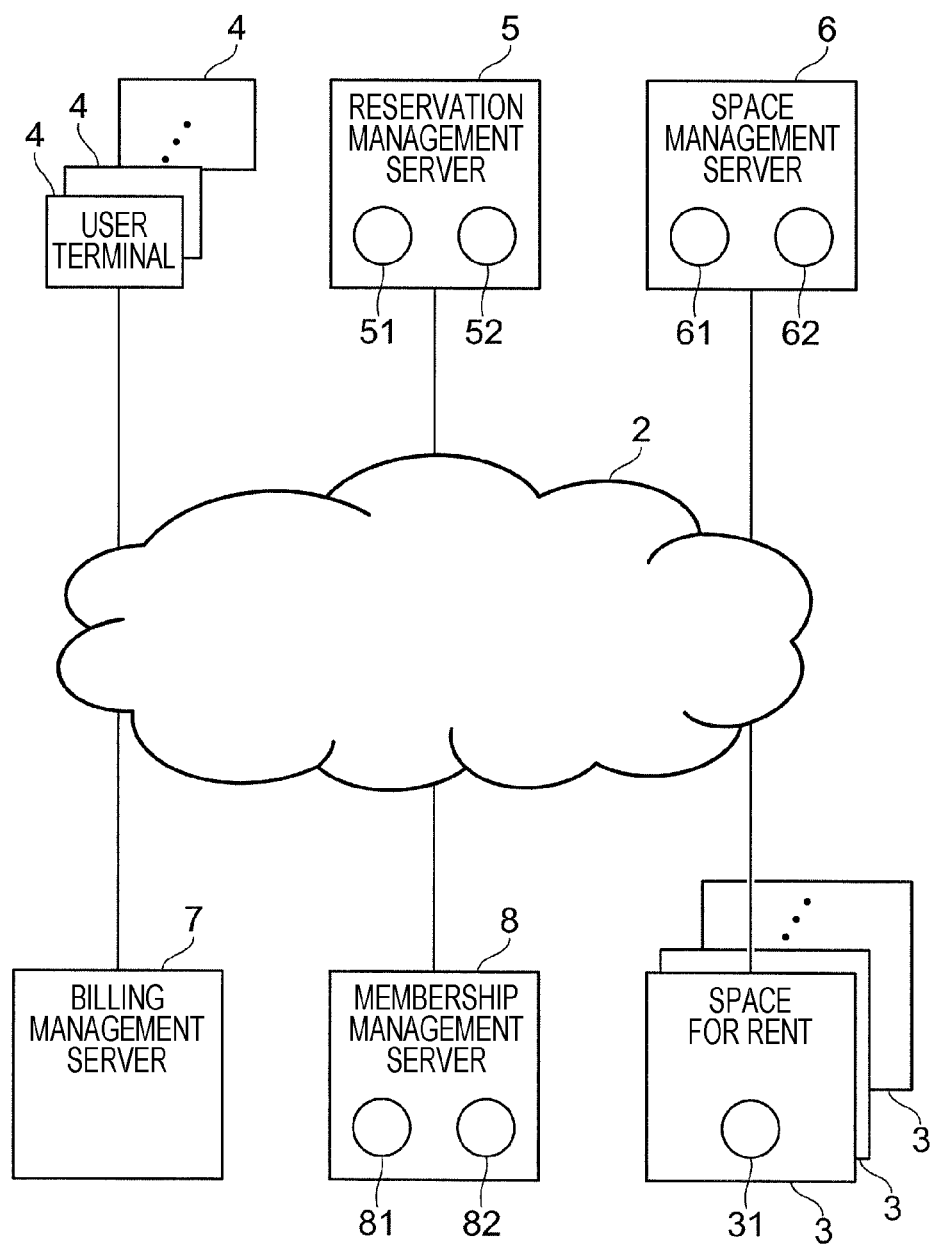
FIG. 1 schematically illustrates an example of the overall configuration of a management system.

FIG. 1 schematically illustrates an example of the overall configuration of a management system 1.

As shown in FIG. 1, the management system 1 is constituted by various terminals connected to a cloud network 2.

In the example in FIG. 1, the management system 1 includes multiple spaces 3 for rent, multiple user terminals 4, a reservation management server 5, a space management server 6, a billing management server 7, and a membership management server 8. The spaces 3 for rent are spaces to be rented on a time basis. Hereinafter, the spaces 3 for rent may simply be called the spaces 3. The user terminals 4 are carried by individual users using the spaces 3. The reservation management server 5 manages reservations for the spaces 3. The space management server 6 manages the usage statuses of the individual spaces 3. The billing management server 7 bills users for the use of the spaces 3. The membership management server 8 manages information concerning members entitled to use the spaces 3.

The spaces 3 are available twenty-four hours a day, seven days a week (24/7), except for the time reserved for maintenance, for example.

In the management system 1 shown in FIG. 1, one server is provided for one purpose (function). Alternatively, plural servers may be provided for one purpose (function). Conversely, one server may be provided for multiple purposes (functions).

Renting services for the spaces 3 may be provided by one business operator or plural business operators. For example, different business operators may separately conduct management concerning reservations, access to and usage statuses of the spaces 3, billing for the use of the spaces 3, and members registered as users. Alternatively, multiple business operators may conduct management concerning one purpose (function) collaboratively.

Plural servers may be provided for one purpose (function). If a single business operator provides plural servers for one purpose (function) or provides plural servers for multiple purposes (functions), the plural servers are connected to each other via an intranet.

The spaces 3 may be provided by a single business operator or plural business operators.

The management system 1 may be implemented as an aggregation of services provided by plural business operators.

In the first exemplary embodiment, a digital key is used for locking and unlocking a space 3. A digital key is stored in a user terminal 4 or an integrated circuit (IC) card which supports near field communication (NFC) (not shown). If a user terminal 4 is used as a digital key, a digital key is provided from the reservation management server 5 to the user terminal 4 after a reservation is confirmed. If an IC card is used as a digital key, an IC card having a digital key recorded thereon is distributed from the reservation management server 5 to a user terminal 4 after a reservation is confirmed.

The use of a digital key makes it possible to freely determine an effective time period for which a space 3 can be locked and unlocked. Multiple digital keys for using one space 3 for the same time period may be issued.

Alternatively, multiple physical keys may be provided according to the reserved time to lock and unlock a space 3. User authentication may alternatively be conducted instead of the use of a key or as a function for supporting the use of a digital key or a physical key.

The reservation management server 5 manages a registration list 51 and a reservation list 52. In the registration list 51, vacancies for spaces 3 are registered. The reservation management server 5 manages the allocation of reservation holders to the spaces 3 by using the reservation list 52.

In the first exemplary embodiment, the reservation management server 5 receives reservation requests for the spaces 3 24/7, except for the time reserved for maintenance, for example. The reservation management server 5 also issues digital keys to the user terminals 4 and conducts authentication if necessary. The space management server 6 may alternatively conduct authentication.

The space management server 6 manages information 61 concerning access to the individual spaces 3 and information 62 concerning the usage statuses of the individual spaces 3. The space management server 6 also serves the function of communicating with an authentication unit 32A (see FIG. 2) disposed in a space 3 to decide whether to permit a user to enter this space 3. When conducting authentication, the space management server 6 communicates with the reservation management server 5.

The space management server 6 also serves the function of collecting information from various devices 31 disposed in a space 3 and controlling the various devices 31.

The space management server 6 is connected to the cloud network 2 in FIG. 1. However, some or all of the functions of the space management server 6 may be integrated in a space 3.

The billing management server 7 serves the function of billing an individual member (may be a natural person (individual) or a legal person (enterprise)) based on reservation information, user information, information concerning access to a space 3. The billing management server 7 obtains reservation information from the reservation management server 5, information concerning access to a space 3 from the space management server 6, and membership information from the membership management server 8.

The membership management server 8 manages information concerning registered members and information concerning users. If a member is an individual person, the member is a user using a space 3. If a member is an enterprise, individual users are registered and managed according to the member.

Figure 2:
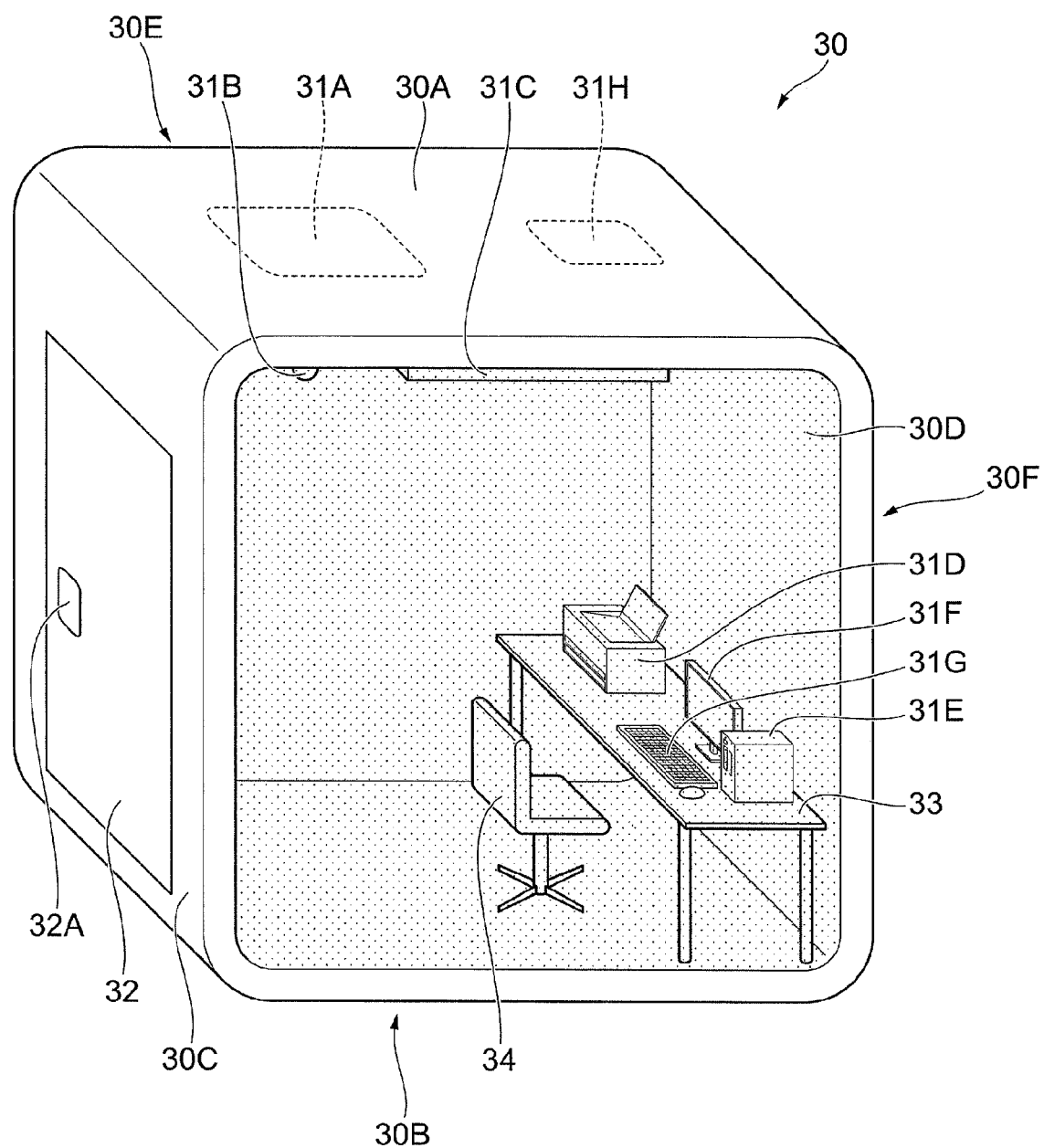
FIG. 2 is an external view of an example of the configuration of a space to be rented to a user.

FIG. 2 is an external view of an example of the configuration of a space 3 to be rented to a user.

In the first exemplary embodiment, the spaces 3 are disposed indoors and outdoors, such as in station buildings, airports, office buildings, commercial complexes, for example, restaurants and department stores, banks, libraries, art galleries, museums, public institutions and facilities, passageways, and parks.

In the first exemplary embodiment, a soundproof, small room is assumed as a space 3. In this sense, the space 3 is an example of a closed space. In the first exemplary embodiment, however, "closed" does not mean "sealed", but is used in the sense of a space having a practical soundproof function. Openings and gaps, such as vent holes and small windows, may be provided in part of a skeleton 30 forming a space 3.

The skeleton 30 includes a ceiling 30A, a floor 30B, a wall 30C to which a door 32 is fixed, two walls 30D and 30E at both sides of the wall 30C, and a wall 30F opposite the door 32.

In the first exemplary embodiment, a single hinged door is assumed as the door 32. In the single hinged door, a single door member is opened and closed such that it draws an arc. However, the door 32 may be a double hinged door having two door members.

The door 32 may be a sliding door. The sliding door may be a single sliding door in which one door member slides, a multiple sliding door set in which two or more door members slide in opposite directions on different rails, or a separate double sliding door set in which one door member slides to the left and the other door member slides to the right.

The door 32 may be a folding door in which a pair of door members connected by a hinge opens to fold back. The folding door has a single type which opens to one side and a double type which opens to two sides.

The door 32 may be a special door, such as a partition door or a pocket door which is withdrawn into a wall when it is not used.

The door 32 may be an inward opening type or an outward opening type.

In the first exemplary embodiment, the walls 30D and 30E are partly constituted by a light-transmitting member, such as glass and acrylic resin, for example.

The structure, material, or processing to implement a blind function may be utilized for at least part of the walls 30D and 30E. The blind function makes it difficult to see the inside of the space 3 from the outside or to reduce the visibility through the walls 30D and 30E.

The material of the walls 30D and 30E may be a translucent member or a member with small scratches on its surface so as to cause light to scatter. A film-like member having a similar function may be attached to the walls 30D and 30E. The film-like member may be a liquid crystal film that can electrically switch between a transparent state and an opaque state or a polarizing film that can electrically control the luminous transmittance.

A structure or a member for a blind function may be provided separately. The walls 30D and 30E, as well as the other surfaces, may be made of a member that does not transmit light. Conversely, among the elements forming the skeleton 30, three or more surfaces may be made of a transparent or translucent member.

The number of users using a space 3 is largely determined by the volume of this space 3. Basically, in the first exemplary embodiment, a private room for one person is assumed as a space 3. However, the space 3 may be a large room for accommodating a large group of people. A large room may be formed as one room, or it may be formed by interconnecting spaces 3 by removing one of or both of the walls 30D and 30E of each space 3.

A private room is not necessarily for only one person, and may be used for a few people, such as two or three people.

The configuration and structure of the skeleton 30 forming an individual space 3, and facilities to be provided by the space 3 and their performance may be determined as desired.

In the first exemplary embodiment, one desk 33 and one chair 34 are disposed within the skeleton 30. On the desk 33, a printer 31D, a computer 31E, a display device 31F, and an input device 31G, which are examples of the devices 31, are placed. To protect user information, data and history information stored in the computer 31E are all deleted under the control of the system after the use of the space 3.

As the other devices 31, an air conditioner 31A, a human sensor 31B, a lighting fixture 31C used as indoor illumination, a control device 31H, and an authentication unit 32A are fixed. The control device 31H controls the operation of electronic devices including the devices 31.

The devices 31 are only examples of electronic devices. The printer 31D, the computer 31E, the display device 31F, and the input device 31G on the desk 33 may not necessarily be provided. In this case, a user uses its own computer or smartphone.

The entirety of the space 3 (including the skeleton 30) is an example of an apparatus.

Each of the user terminal 4, the reservation management server 5, the space management server 6, the billing management server 7, and the membership management server 8 is also an example of the apparatus.

The management system 1 is an example of a management system.

[Configuration of Terminal]

Examples of the configurations of the terminals forming the management system 1 will be discussed below with reference to FIGS. 3 through 5.

Figure 3:
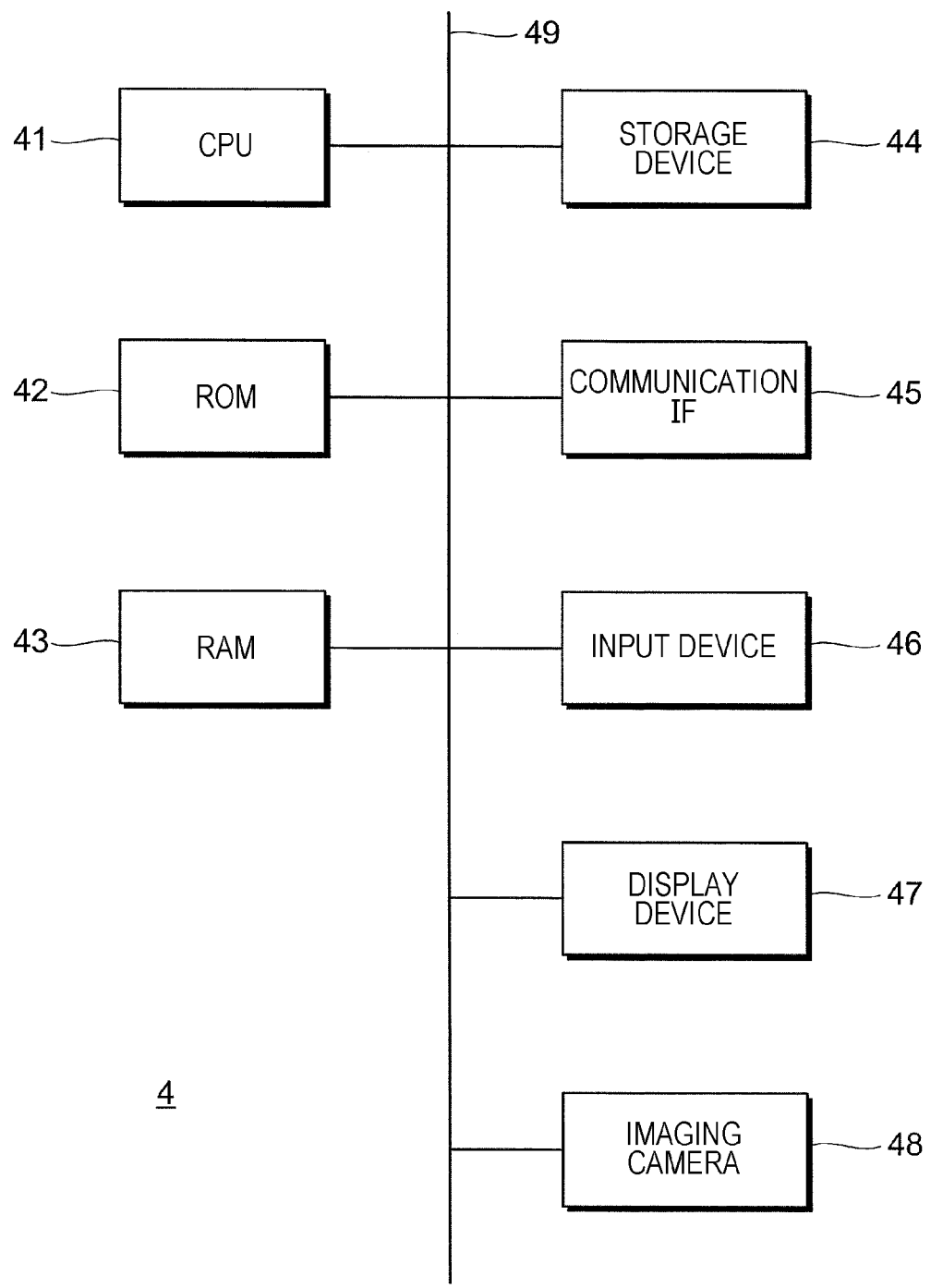
FIG. 3 is a block diagram illustrating an example of the hardware configuration of a user terminal.

FIG. 3 is a block diagram illustrating an example of the hardware configuration of the user terminal 4.

In the first exemplary embodiment, a smartphone is used as the user terminal 4.

The user terminal 4 includes a central processing unit (CPU) 41, a read only memory (ROM) 42, and a random access memory (RAM) 43. The CPU 41 provides various functions by executing firmware and application programs. The ROM 42 is a storage area in which firmware and basic input output system (BIOS) are stored. The RAM 43 is an area where a program is executed.

The user terminal 4 also includes a volatile storage device 44, a communication interface 45 (communication IF), an input device 46, such as a touchscreen, a display device 47, and an imaging camera 48. The storage device 44, which is a semiconductor memory, for example, stores downloaded application programs and a digital key, for example. The communication IF 45 is used for communicating with external devices. The display device 47 is used for displaying information.

The CPU 41 is connected to the devices forming the user terminal 4 via a bus 49.

Figure 4:
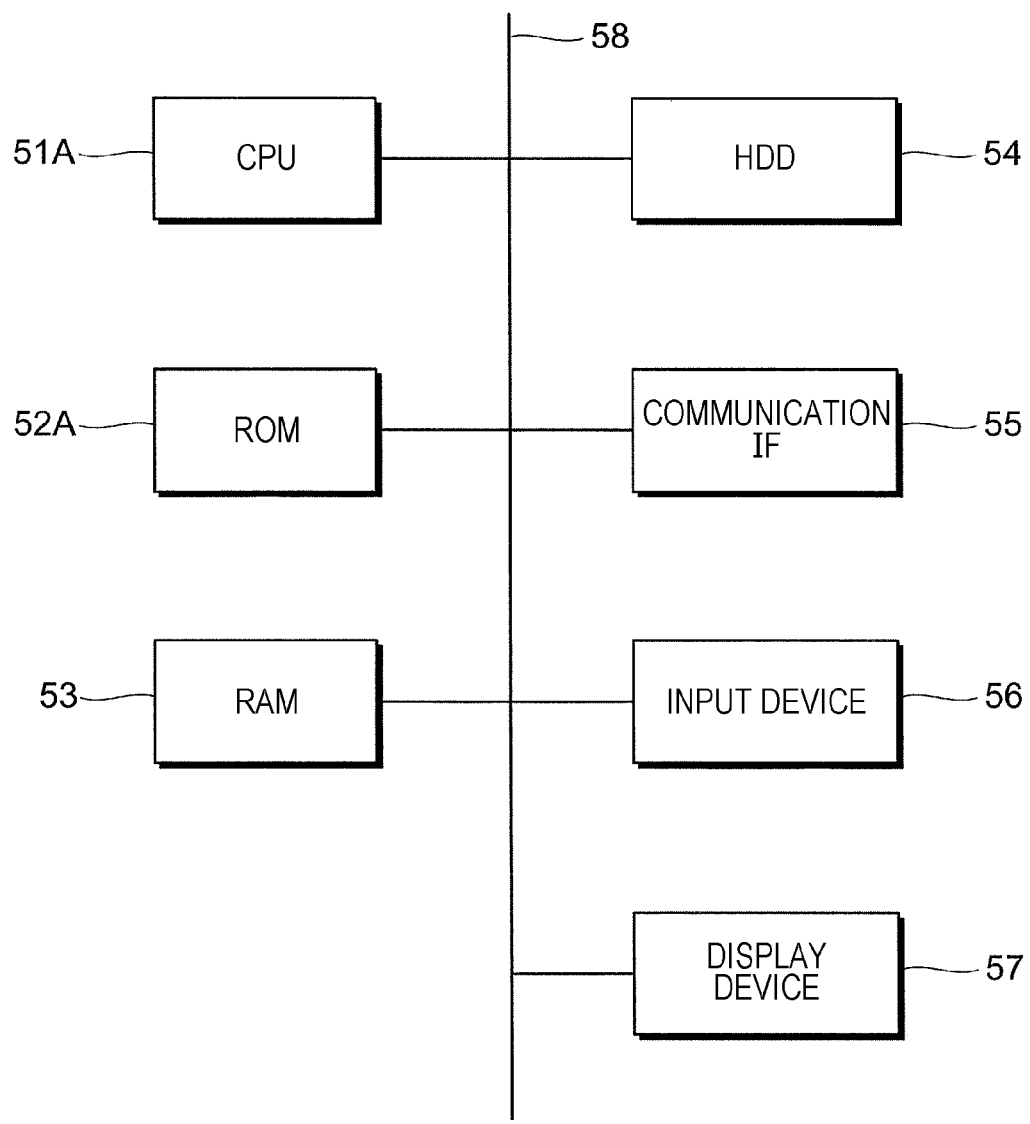
FIG. 4 is a block diagram illustrating an example of the hardware configuration of a server forming the management system.

FIG. 4 is a block diagram illustrating an example of the hardware configuration of a server forming the management system 1.

The configuration of the reservation management server 5 is shown in FIG. 4 as a typical example of the server. The configurations of the other servers, that is, the space management server 6, the billing management server 7, and the membership management server 8, are similar to the configuration of the reservation management server 5.

The reservation management server 5 includes a CPU 51A, a ROM 52A, and a RAM 53. The CPU 51A provides various management functions by executing an operating system (OS) and application programs. The ROM 52A is a storage area in which an OS and a BIOS are stored. The RAM 53 is an area where a program is executed.

The reservation management server 5 also includes a volatile hard disk drive (HDD) 54, a communication IF 55, an input device 56, such as a keyboard, and a display device 57. The HDD 54 stores application programs and various items of management data for implementing the associated management functions. The communication IF 55 is used for communicating with external devices. The display device 57 is used for displaying information.

The CPU 51A is connected to the devices via a bus 58.

Each server is an example of a database for storing management data. That is, each server is an example of a first database and an example of a second database.

Figure 5:
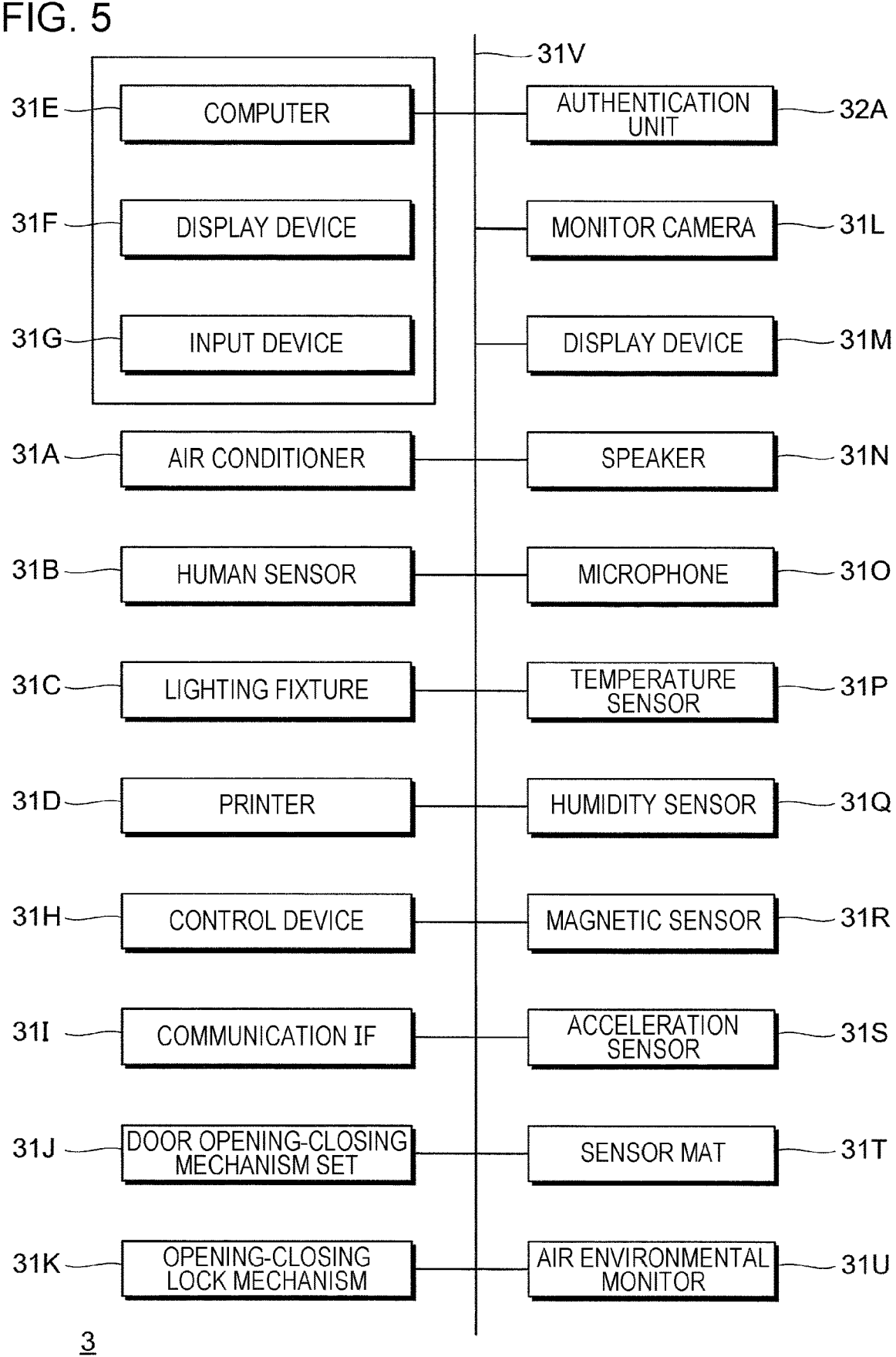
FIG. 5 is a block diagram illustrating an example of the configuration of a space which forms the management system.

FIG. 5 is a block diagram illustrating an example of the configuration of a space 3 which forms the management system 1.

The space 3 includes an air conditioner 31A, a human sensor 31B, a lighting fixture 31C, a printer 31D, a computer 31E, a display device 31F, an input device 31G, a control device 31H, and an authentication unit 32A.

The air conditioner 31A is used for adjusting the temperature and humidity within the space 3 (room). A mechanism specially used for ventilation (ventilation device) may be provided, together with or separately from the air conditioner 31A. The ventilation device includes an air supply unit which supplies fresh air into a room and an exhaust unit which exhausts air in the room outside.

The human sensor 31B is a sensor for detecting people within the space 3. As the human sensor 31B, various types of sensors, such as a pyroelectric infrared human sensor that can detect the motion of people, and an image human sensor and a thermopile human sensor that can detect the number and position of people, are available. One or plural of these types of sensors are used according to the purpose of use.

The printer 31D, the computer 31E, the display device 31F, and the input device 31G are examples of information devices installed in the room for a user to operate. These information devices are connected to each other via a local area network (LAN) 31V, such as a LAN cable or a wireless LAN. If a user brings its own computer, the computer is connected to the LAN 31V. As the wireless LAN, WiFi (registered trademark) or Bluetooth (registered trademark) is used.

The control device 31H is a control computer that collects information from the devices 31 connected to the LAN 31V and also controls the operations of the individual devices 31. In some management systems 1, the control device 31H provides the functions of the space management server 6.

The authentication unit 32A is fixed to the door 32 of the space 3, for example. The authentication unit 32A is used for obtaining and sending and receiving information required for locking and unlocking the door 32. Authentication is conducted in the reservation management server 5, and an authentication result is only supplied to the authentication unit 32A. When authentication has succeeded, the authentication unit 32A unlocks the door 32. After unlocking the door 32, a user can open and close the door 32 to enter the space 3 (see FIG. 2).

The space 3 also includes a communication IF 31I for communicating with external devices. The communication IF 31I is connected to the cloud network 2 (see FIG. 1) to communicate with various servers.

The space 3 also includes a door opening-closing mechanism set 31J for mechanically controlling the opening and closing of the door 32. The door opening-closing mechanism set 31J includes a mechanism for driving the door 32 to open and close and a mechanism for adjusting the magnitude of a load required for a user to open and close the door 32.

The space 3 also includes an opening-closing lock mechanism 31K. The opening-closing lock mechanism 31K temporarily stops the opening and closing of the door 32. While the opening-closing lock mechanism 31K is in operation, at least the operation of closing the door 32 is temporarily stopped.

The space 3 also includes a monitor camera 31L for monitoring the motion of users indoors and outdoors. However, the monitor camera 31L may not necessarily be provided.

The space 3 also includes a display device 31M. In the first exemplary embodiment, the display device 31M is disposed on the external side of the wall 30C to which the door 32 is fixed, and is used for a user to operate when entering the space 3 and also for providing information. The display device 31M is also used for a user using the space 3 and also for providing information. The display device 31M is an example of an informing device The space 3 also includes a speaker 31N. The speaker 31N is used for supplying information to a user indoors and to people outdoors. The speaker 31N is an example of the informing device.

The space 3 also includes a microphone 31O. The microphone 31O is used for collecting indoor sound.

The space 3 also includes a temperature sensor 31P. The temperature sensor 31P is used for measuring the indoor temperature.

The space 3 also includes a humidity sensor 31Q. The humidity sensor 31Q is used for measuring the indoor humidity.

The space 3 also includes a magnetic sensor 31R. The magnetic sensor 31R is attached to the door 32 to detect the opening or closing of the door 32 by sensing a magnetic force.

The space 3 also includes an acceleration sensor 31S. The acceleration sensor 31S is used for detecting the motion of an object.

The space 3 also includes a sensor mat 31T. The sensor mat 31T detects the weight of an object to visualize the time period for which a user has stayed in the space 3 or the congestion status of the space 3.

The space 3 also includes an air environmental monitor 31U. The air environmental monitor 31U, which detects constituents contained in air in the space 3, measures concentrations of PM2.5 and PM10, carbon dioxide, and volatile organic compounds. The air environmental monitor 31U may also measure the temperature and the humidity. The air environmental monitor 31U may not necessarily measure all of the above-described constituents or may measure other constituents. If the air environmental monitor 31U measures the temperature and the humidity, the provision of the temperature sensor 31P and the humidity sensor 31Q may be omitted.

[Control Function]

A control function implemented by one of the terminals forming the management system 1 or by collaborative work of some of the terminals will be discussed below with reference to FIG. 6.

It is assumed that the reservation management server 5 operated by a specific business operator (operator A) collaboratively works with the reservation management server 5 operated by another business operator (operator B), which is a partner operator of operator A.

This collaborative work is implemented as a result of the CPU 51A (see FIG. 4) of the reservation management server 5 of each business operator executing a program.

In the first exemplary embodiment, the reservation management server 5 of a certain business operator preferentially provides spaces 3, which are products of this business operator, over those of the other business operators. When the reservation management server 5 is unable to provide their spaces 3 to a user, it provides a space 3 of their partner operator.

Figure 6:
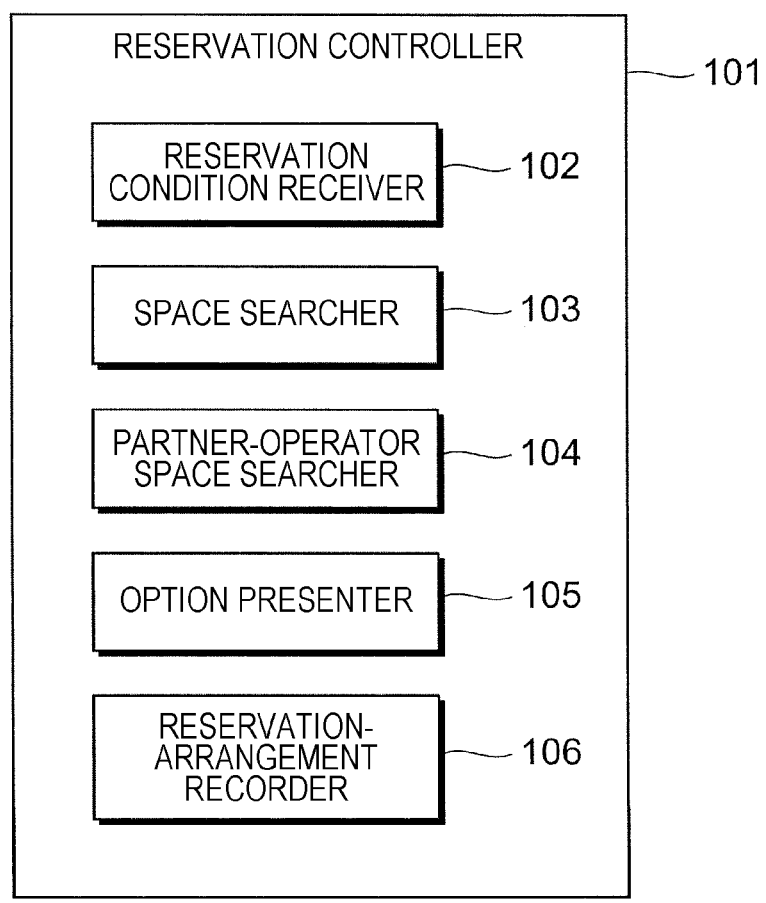
FIG. 6 is a block diagram illustrating an example of the software configuration of a central processing unit (CPU)

FIG. 6 is a block diagram illustrating an example of the software configuration of the CPU 51A.

The CPU 51A serves as a reservation controller 101 as a result of executing a program. The reservation controller 101 is an example of a presenter.

The reservation controller 101 includes multiple functions.

More specifically, the reservation controller 101 includes a reservation condition receiver 102, a space searcher 103, a partner-operator space searcher 104, an option presenter 105, and a reservation-arrangement recorder 106. The reservation condition receiver 102 receives a condition for a reservation from a user. The space searcher 103 preferentially searches for spaces 3 managed by its own business operator over those managed by other business operators. The partner-operator space searcher 104 searches for spaces 3 managed by a partner operator when its business operator is unable to provide one of their spaces 3 to a user. The option presenter 105 presents the spaces 3 that match a reservation condition to a user as options. When the user has reserved a space 3 provided by a partner operator, the reservation-arrangement recorder 106 records that the reservation has been arranged by its own operator.

The reservation condition receiver 102 serves the function of receiving a condition for a reservation from a user using the user terminal 4 (see FIG. 1). Examples of the condition for a reservation are a location and a time period. The time period is identified by a start time and an end time. Other examples of the condition for a reservation may be facilities installed in a space 3 and a service provider. Only one of such conditions may be set.

The space searcher 103 searches for a space 3 that matches the requested condition among the spaces 3 managed by its business operator.

The partner-operator space searcher 104 is a function to be used when its business operator is unable to provide one of their spaces 3 to a user. The partner-operator space searcher 104 searches for a space 3 that matches the requested condition among the spaces 3 managed by a partner operator.

The option presenter 105 presents as options spaces 3 that match the requested condition obtained by a search conducted by the space searcher 103 or the partner-operator space searcher 104. In the first exemplary embodiment, if the spaces 3 that match the requested condition are not found in its operator or a partner operator, an alternative option is presented.

When a user reserves a space provided by a partner operator through the website of the business operator of the reservation management server 5, the reservation-arrangement recorder 106 records that such a reservation has been arranged by its operator.

In the first exemplary embodiment, this record is used for receiving a certain arrangement fee from a partner operator when a reservation is made in this partner operator. The record is also used for providing a reward fee to a user in exchange for the use of a space 3 of a partner operator. The reward fee to a user may be money or points.

The reward fee is granted to a user for the operational reason. If a user reserves a space 3 managed by a partner operator, the reward fee may be used for covering the transportation cost to get to the reserved space 3.

[Examples of Control Operation]

Examples of the control operation implemented under the control of the reservation controller 101 (see FIG. 6) will be described below.

The overall picture of reservation services implemented under the control of the reservation controller 101 will first be explained.

Figure 7:
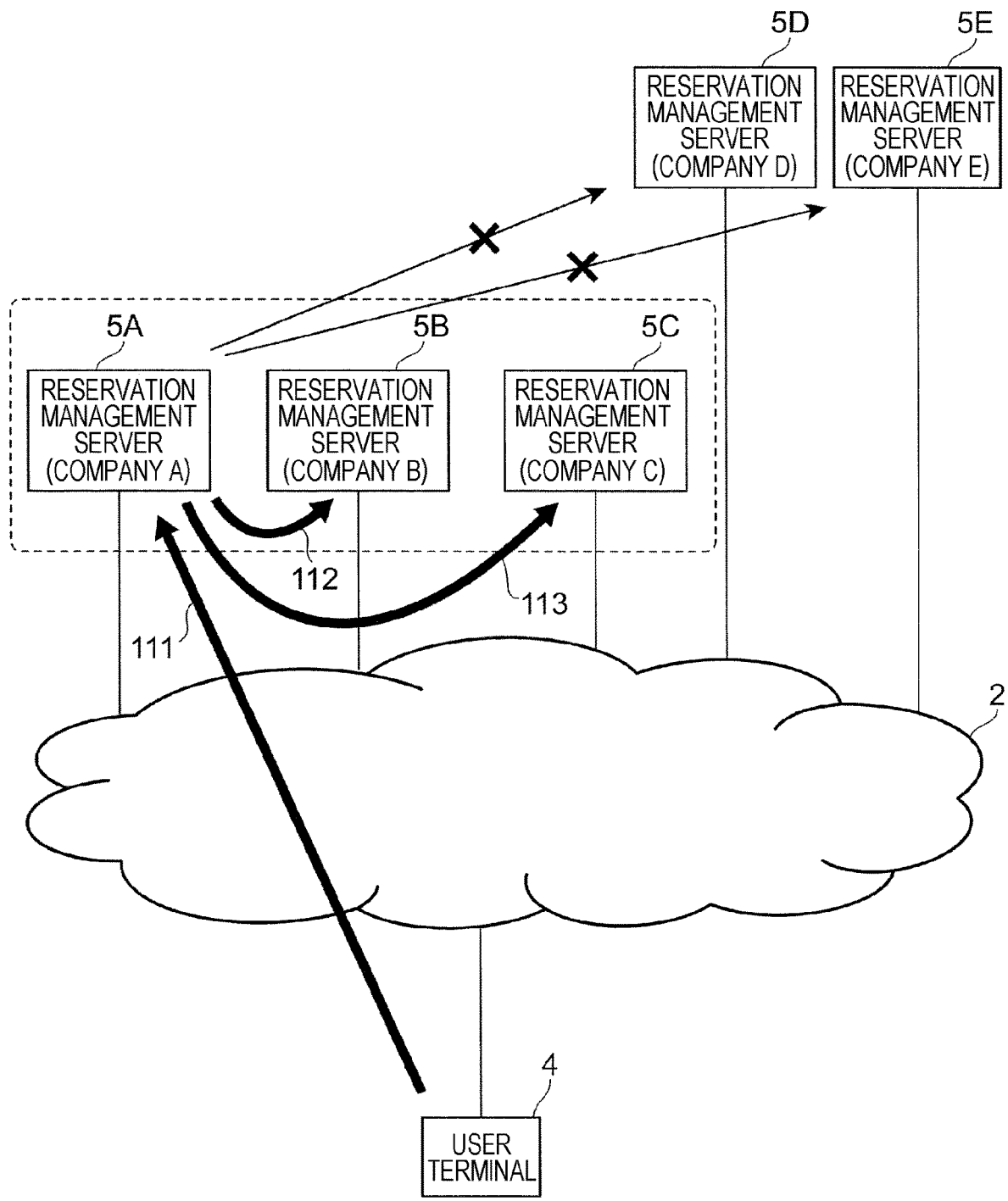
FIG. 7 illustrates how reservation making is conducted in a first exemplary embodiment.

FIG. 7 shows how reservation making is conducted in the first exemplary embodiment.

In FIG. 7, portions corresponding to those shown in FIG. 1 are designated by like reference numerals.

In the example in FIG. 7, terminals only related to reservation making are shown. Five reservation management servers 5A, 5B, 5C, 5D, and 5E are shown. The reservation management servers 5A, 5B, 5C, 5D, and 5E correspond to company A, company B, company C, company D, and company E, respectively, operating renting services for providing spaces 3.

In the first exemplary embodiment, company A, company B, company C form a partnership with each other, while company D and company E operate services independently.

In the first exemplary embodiment, "forming a partnership" means that business operators help each other out to provide a space 3 that matches a requested condition to a user. More specifically, if a certain business operator receiving a reservation request from a user is unable to find a space 3 that matches a requested condition, it recommends a space 3 managed by a partner operator to the user. In the example in FIG. 7, company A, company B, company C form a partnership to help each other out.

In FIG. 7, it is assumed that a user has accessed a reservation site of company A, as indicated by an arrow 111 heading from the user terminal 4 to the reservation management server 5A.

In the first exemplary embodiment, the reservation management server 5A conducts a search for a space 3 that matches a requested condition in two steps.

In the first step, the reservation management server 5A conducts a search among spaces 3 managed by its own business operator, that is, company A. The user has first accessed the reservation site of company A, and thus, the user most probably wishes to use a space 3 provided by company A.

In the second step, the reservation management server 5A conducts a search among spaces 3 managed by a partner operator, such as company B. If company A is unable to provide one of their spaces 3 to a user, it provides a similar space 3 of a partner operator to the user.

In this case, the user can reserve a space 3 through the accessed site of company A without accessing the site of company B and inputting the requested condition again.

The user uses a space 3 of company B or company C through company A and is thus likely to receive services comparable to those provided by company A.

Arrows 112 and 113 in FIG. 7 indicate the directions of the arrangements made from company A to company B and company C when company A is unable to provide a space 3 that matches a requested condition but company B and company C is able to provide such a space 3.

Such an arrangement is not made from company A to company D or company E that does not have a partnership with company A. Cross marks (X) are thus placed on the arrows from company A to company D and company E.

Figure 8:
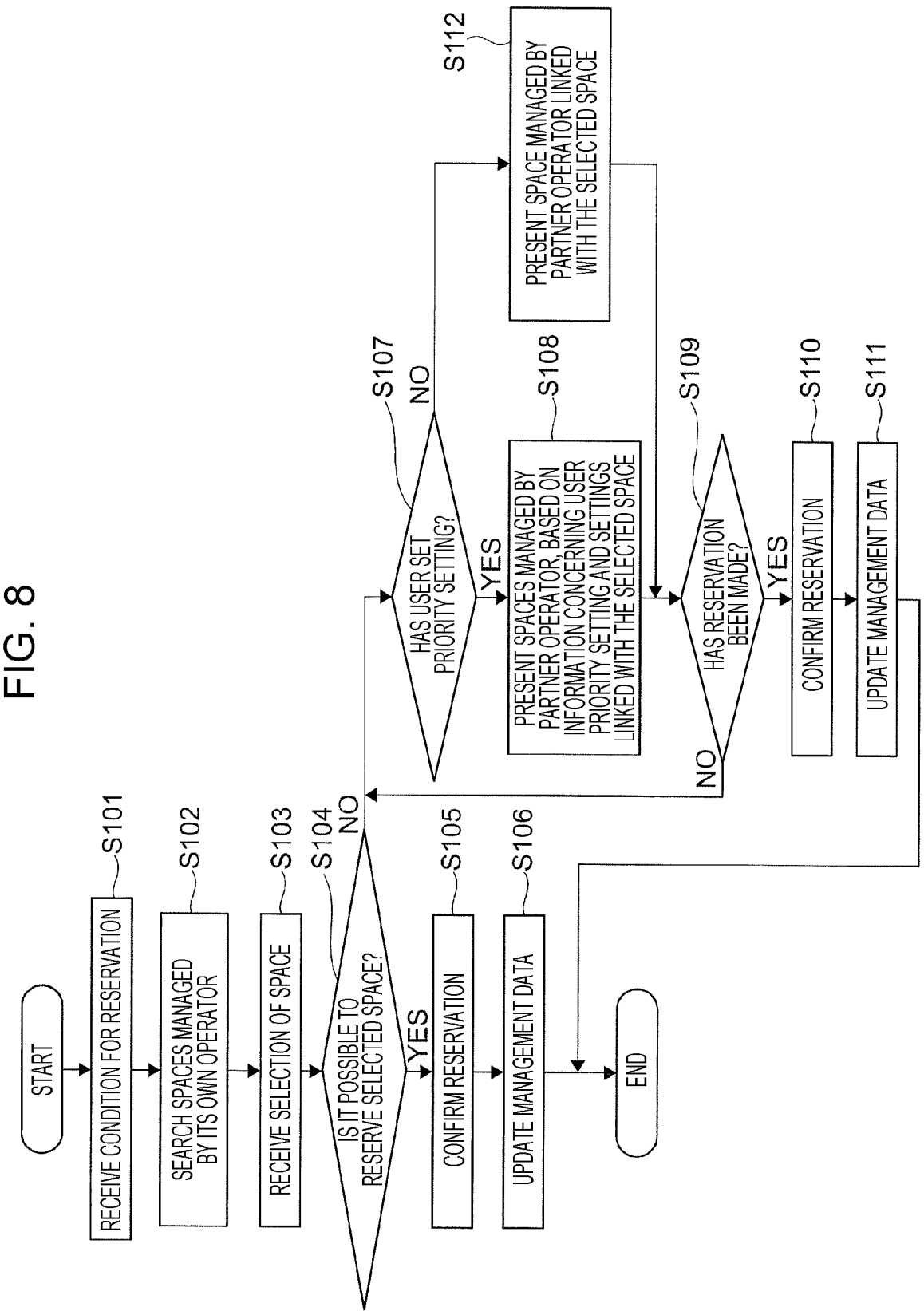
FIG. 8 is a flowchart illustrating an example of processing executed by a reservation controller of a reservation site (reservation management server) accessed by a user.

FIG. 8 is a flowchart illustrating an example of processing executed by the reservation controller 101 of a reservation site (reservation management server 5) accessed by a user.

A description will be given below, assuming that the user has accessed the reservation management server 5A (see FIG. 7) of company A.

In step S101, the reservation controller 101 receives a condition for a reservation from the user. As the condition, a location name, for example, is input.

Then, in step S102, the reservation controller 101 searches for a space 3 that matches the input condition among the spaces 3 managed by company A. If multiple spaces 3 that match the condition are found, the reservation controller 101 presents them to the user as options. When presenting options, the reservation controller 101 may execute processing not to receive a reservation for the options from another user.

In step S103, the reservation controller 101 receives selection of an option from the user.

Then, in step S104, the reservation controller 101 judges whether it is possible to reserve the selected option. If the option can be reserved (YES in step S104), the reservation controller 101 confirms the reservation in step S105 and updates management data in step S106.

If it is found that it is not possible to reserve the selected option (NO in step S104), the reservation controller 101 proceeds to processing for searching for a space 3 in a partner operator.

If it is found as a result of a search in step S102, that the space 3 that satisfies the condition is not available, the reservation controller 101 proceeds to step S104 by skipping step S103, and the result of step S104 becomes NO.

Before conducting a search, the reservation controller 101 judges in step S107 whether the user has set a priority setting.

The priority setting is a setting concerning which condition will be prioritized when presenting spaces 3 of a partner operator. Examples of the priority conditions are a shorter distance or time required for a user to move from a designated space 3, a lower cost incurred to move from a designated space 3, a longer extendable time to use a space 3, more facilities installed in a space 3, higher benefits to company A for the use of a space 3 of a partner operator, and the use of a prioritized partner operator.

The distance or time required for the user to move from a designated space 3 may be that from the current position of the user used as a start point.

The cost incurred to move from a designated space 3 may be the transportation cost paid by the user or a difference between the transportation cost and a reward fee granted to the user for the use of a partner operator.

Benefits to company A are the amount of arrangement fee received from a partner operator for the arrangement of reservation making for this partner operator.

The rating level may be calculated for each space 3, and a space 3 having a higher rating level may be preferentially selected.

If the user has set a priority setting (YES in step S107), in step S108, the reservation controller 101 presents spaces 3 managed by the partner operator as options, based on information concerning the user priority setting and settings linked with the selected space 3.

FIG. 9 illustrates an example of a management table (including information concerning priority settings) referred to by the reservation controller 101.

A management table 150 shown in FIG. 9 includes plural fields 151 through 161.

The field 151 indicates a list of spaces 3 managed by company A. In FIG. 9, the space 3 (A#05002) selected by the user in step S103 (see FIG. 8) is indicated by the bold frame.

The field 152 is for a management company. The management table 150 in FIG. 9 is shown, assuming that the reservation controller 101 is the reservation management server 5A (see FIG. 7) of company A, and "A" representing company A is indicated in all the columns of the field 152. Information in the field 152 is necessary if company A outsources operation of their reservation site to another company.

The field 153 indicates a list of spaces 3 managed by partner operators linked with the individual spaces 3 managed by company A.

In FIG. 9, a space 3 identified by B#20556 is linked with the space 3 identified by A#05002. In this case, spaces 3 are linked with each other based on a one-to-one correspondence. However, plural spaces 3 may be linked with one space 3. Plural spaces 3 linked with one space 3 may be managed by different partner operators.

In FIG. 9, a space 3 of a partner operator is linked with an individual space 3 managed by company A. Alternatively, a partner operator may be liked with an individual space 3 managed by company A. In this case, the field 153 is not required.

The field 154 is for a management company which manages a space 3 linked with an individual space 3 in the field 151.

The field 155 is for information concerning the distance or time required for a user to move from a designated space 3.

In the example in FIG. 9, the shortest distance or time is represented by a double circle, the second shortest distance or time is represented by a circle, and the third shortest distance or time is represented by a triangle.

Although in FIG. 9 information is represented by symbols, numeric values indicating the rating for the distance or time may be recorded. Numeric values indicating the distance or the time may alternatively be recorded.

The field 156 is for the transportation cost. The user may be required to use public transportation, such as trains and buses, to get to a space 3 linked with the selected space 3. If the user walks to a space 3, no transportation cost is incurred, and a higher rating is given to such a space 3. In the example in FIG. 9, the lowest transportation cost is represented by a circle, the second lowest transportation cost is represented by a triangle, and the third lowest transportation cost is represented by a cross mark (X).

The field 157 is for the extendable time of a space 3. Information in this field 157 is changeable depending on the relationship with another reservation made in this space 3. In the example in FIG. 9, the longest extendable time is represented by a circle, the next longest extendable time is represented by a triangle, and if an extension is not possible, a cross mark (X) is indicated.

The field 158 is for the availability of installed facilities. In FIG. 9, if many facilities are installed, a double circle is indicated, if some facilities are installed, a circle is indicated, and if few facilities are installed, a triangle is indicated.

Items of information indicated in the fields 155 through 158 correspond to user priority settings.

The field 159 shows a matching degree which represents how much a linked space 3 matches reservation requests made by a user. "Third" is input for the space 3 (B#20556) indicated by the bold frame. This means that the matching degree of the space 3 (B#20556) linked with the space 3 (A#05002) is ranked third among the spaces 3 that can be provided by company B and company C, which are partner operators. In the field 159, the total rating for the items of information in the fields 155 through 158 may be input.

The field 160 is for the arrangement fee paid to company A. The actual arrangement fee varies depending on an individual contract. The arrangement fee may be calculated based on the application program used for displaying the reservation site and information concerning linked websites.

The field 161 is for the reward fee paid to a user. The reward fee covers the transport fee and some other inconveniences incurred for the use of a space 3 managed by a partner operator. If the transport fee and other inconveniences are not incurred, the reward fee may be zero.

Referring back to FIG. 8, after step S108, the reservation controller 101 judges in step S109 whether a reservation has been made for the presented option.

If the result of step S109 is NO, the reservation controller 101 returns to step S107. The reservation controller 101 presents another option by disregarding the priority setting, for example.

If the result of step S109 is YES, the reservation controller 101 confirms the reservation in step S110 and updates the management data in step S111.

If the user has not set a priority setting (NO in step S107), in step S112, the reservation controller 101 presents a space 3 managed by a partner operator linked with the space 3 selected by the user.

For example, the reservation controller 101 refers to the field 153 of the management table 150 (see FIG. 9) and presents one or plural options to the user.

Upon completion of a reservation for a space 3 managed by a partner operator, company A may inform the partner operator that a reservation has been made. Such information may be provided every time a reservation is made or when a predetermined number of reservations are made.

The arrangement fee may be settled every time a reservation is made or the total arrangement fee for a month may be settled. The arrangement fee may be calculated based on contract conditions agreed upon with a partner operator.

[Screen Examples]

Examples of screens displayed on the user terminal 4 (see FIG. 1) operated by a user will be discussed below.

FIGS. 10A through 10F illustrate examples of screens displayed during a reservation process.

FIG. 10A illustrates a screen 171 for presenting spaces 3 managed by a renting service operator (company A) as options. FIG. 10B illustrates a screen 172 for a reservation request. FIG. 10O illustrates a screen 173 for presenting spaces managed by partner operators (company B and company C) as alternative options. FIG. 10D illustrates a screen 174 for checking detailed information concerning the alternative options. FIG. 10E illustrates a screen 175 for a reservation request. FIG. 10F illustrates a screen 176 when a reservation has been made.

The screen 171 in FIG. 10A is an example of a screen displayed when a user has provided only a location name as a condition for a reservation. "Available time period" is thus blank on the screen 171.

The screen 172 in FIG. 10B is a reservation request screen for the space 3 A#05002 displayed at the head of the options on the screen 171, and 15:00 to 17:00 is input as a requested time period.

The screen 173 in FIG. 10C shows a message that the space 3 A#05002 is not available for the requested time period and indicates alternative options found by a search conducted for spaces 3 managed by partner operators. In this example, an option B#20556 managed by company B and an option C#00302 managed by company C are presented.

The screen 174 in FIG. 10D is a check screen displayed when the user has selected B#20556 managed by company B. In this example, "Available time period" is blank for checking detailed information. When the user clicks "reservation request screen", the screen 175 shown in FIG. 10E is displayed. In this example, a space 3 which is available during the requested time period is presented as an option, and thus, when the user sends a reservation request on the screen 175, the screen 176 shown in FIG. 10F appears to inform the user that a reservation has been made.

In this manner, the user is able to reserve a space 3 (B#20556) managed by company B by accessing the reservation site of company A. The user does not even have to input the requested condition again.

According to the first exemplary embodiment, a user is able to preferentially search for spaces 3 managed by company A over those by the other companies by accessing their reservation site and inputting a reservation condition. Even when a space 3 is not available in company A, the user is able to reserve a space in company B or company C, which is a partner operator of company A, through the site of company A.

In the case of existing reservation sites, not only spaces managed by partnership operators (company A, company B, and company C), but also those by company D and company E are presented as options. Additionally, spaces 3 of company A, which most interest the user, are not necessarily placed in higher positions of a list of options. Spaces 3 of company D and company E, which do not interest the user very much, are also presented as options.

In the first exemplary embodiment, however, spaces of company A are first presented as options, and if no space 3 is available in company A, spaces 3 of company B and company C that are likely to provide services comparable to those of company A are presented as options.

Among companies (company A, company B, and company C, for example) forming a partnership, spaces 3 of a certain company (company A, for example) first accessed by a user are presented preferentially over those of the other two companies. The space occupancy of company A is thus raised. When no space 3 is available in company A and recommends a space 3 of a partner operator to a user, the user is still able to make a reservation through the site of company A.

For a partner operator (company B or company C, for example), the opportunity to receive reservations through another partner operator (company A, for example) is increased, thereby raising the occupancy of their spaces 3.

Second Exemplary Embodiment

The first exemplary embodiment has been discussed by assuming a reservation of a space 3. In a second exemplary embodiment, the selling of products is assumed.

[Overview of System]

Figure 11:
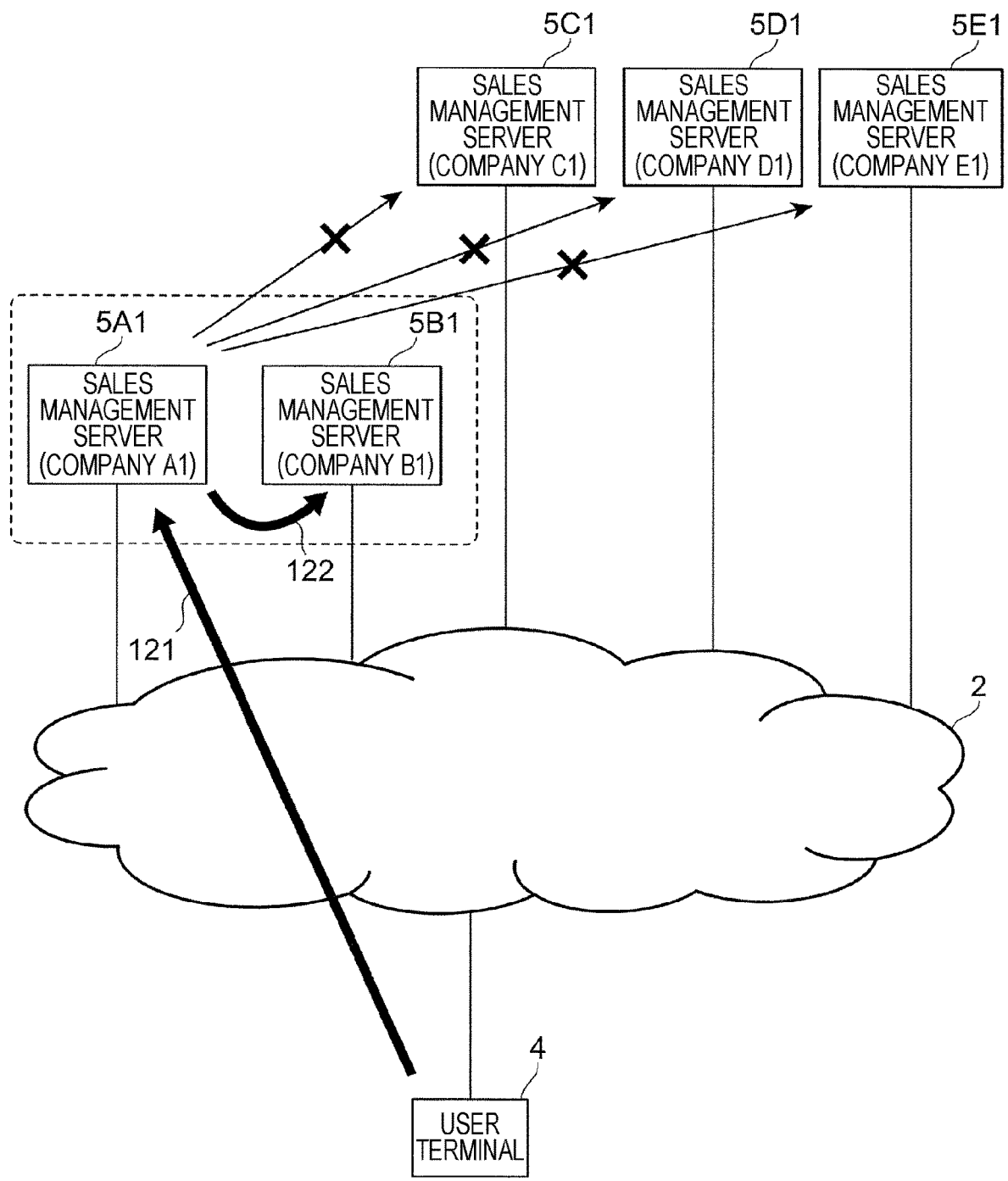
FIG. 11 illustrates how product selling is conducted in a second exemplary embodiment.

FIG. 11 illustrates how product selling is conducted in the second exemplary embodiment.

In FIG. 11, portions corresponding to those shown in FIG. 7 are designated by like reference numerals.

In the example in FIG. 11, terminals only related to product selling are shown. Five sales management servers 5A1, 5B1, 5C1, 5D1, and 5E1 are shown. The sales management servers 5A1, 5B1, 5C1, 5D1, and 5E1 correspond to company A1, company B1, company C1, company D1, and company E1, respectively, which operate sales sites.

The sales companies in the second exemplary embodiment may be manufacturers or producers, or be agents acting for selling products of specific manufacturers or producers or mail order operators.

In the second exemplary embodiment, company A1 and company B1 form a partnership with each other, while company C1, company D1, and company E1 sell products independently.

In the second exemplary embodiment, "forming a partnership" means that sales companies help each other out to provide a product that matches a requested condition to a user. More specifically, if a certain business operator (sales company) receiving a request from a user is unable to provide a product that matches a requested condition, it recommends a product of a partner operator to the user.

In the second exemplary embodiment, a partner operator may be determined according to the product or according to the operator (may be a company or an individual).

In the case of a mail order operator, it may use another mail order operator as a partner operator or a manufacturer or a producer of the products handled by this operator as a partner operator.

In the example of FIG. 11, company A1 and company B1 help each other out to increase the opportunity to sell products.

In FIG. 11, it is assumed that a user has accessed a sales site of company A1, as indicated by an arrow 121 heading from the user terminal 4 to the sales management server 5A1.

In the second exemplary embodiment, the sales management server 5A1 conducts a search for a product that matches a condition requested by a user in two steps.

In the first step, the sales management server 5A1 conducts a search among products handled by its own business operator, that is, company A1. The user has first accessed the sales site of company A1, and thus, the user most probably wishes to purchase a product from company A1.

In the second step, the sales management server 5A1 conducts a search among products handled by a partner operator, such as company B1. If company A1 is unable to provide a product to a user, it provides a similar product of a partner operator.

In this case, the user can purchase a product through the accessed site of company A1 without accessing the site of company B1 and inputting the requested condition again.

The user purchases a product of company B1 through company A1 and is thus likely to receive services comparable to those provided by company A1.

An arrow 122 in FIG. 11 indicates the direction of the arrangement made from company A1 to company B1 when company A1 is unable to provide a product that matches a requested condition but company B1 is able to provide such a product.

The arrangement is not made from company A1 to company C1, company D1, or company E1 that does not have a partnership with company A1. Cross marks (X) are thus placed on the arrows from company A1 to company C1, company D1, and company E1.

[Configuration of Sales Management Server]

An example of the configuration of the sales management server 5A1 will be described below. The hardware configuration of the sales management server 5A1 is similar to that shown in FIG. 4.

Figure 12:
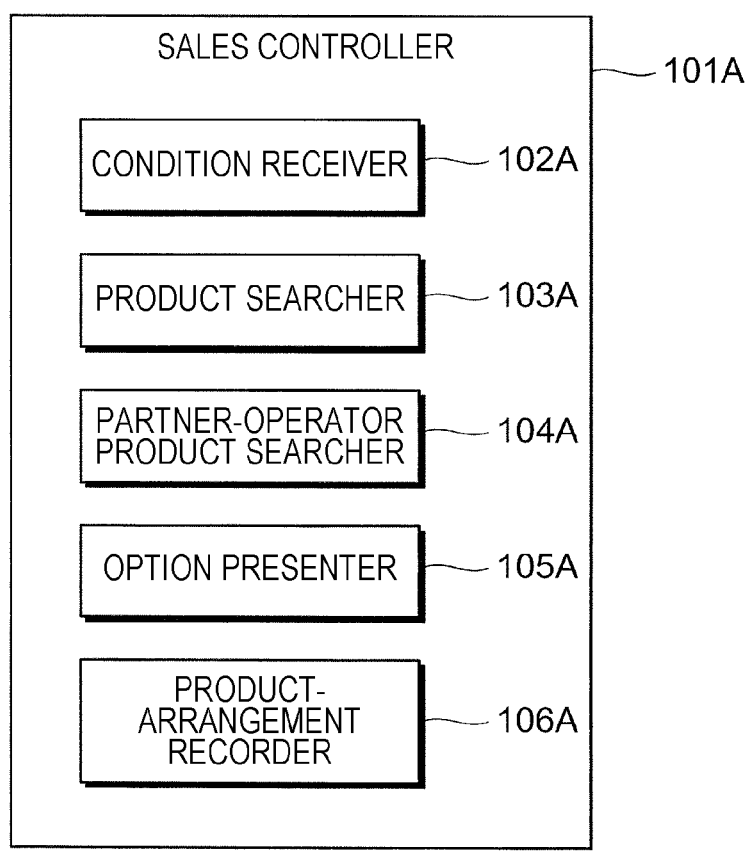
FIG. 12 is a block diagram illustrating an example of the software configuration of a CPU.

FIG. 12 is a block diagram illustrating an example of the software configuration of the CPU 51A (see FIG. 4).

In the second exemplary embodiment, the CPU 51A serves as a sales controller 101A as a result of executing a program. The sales controller 101A is an example of the presenter.

The sales controller 101A includes multiple functions.

More specifically, the sales controller 101A includes a condition receiver 102A, a product searcher 103A, a partner-operator product searcher 104A, an option presenter 105A, and a product-arrangement recorder 106A. The condition receiver 102A receives a condition from a user. The product searcher 103A preferentially searches for products handled by its own business operator over those handled by other operators. The partner-operator product searcher 104A searches for products handled by a partner operator when its own operator is unable to provide a product to a user. The option presenter 105A presents products that match a requested condition to a user as options. When a user has purchased a product handled by a partner operator, the product-arrangement recorder 106A records that the product selling has been arranged by its operator.

The condition receiver 102A serves the function of receiving a condition from a user using the user terminal 4 (see FIG. 1).

The product searcher 103A searches for a product that matches the requested condition among the products handled by its own business operator.

The partner-operator product searcher 104A is a function to be used when its business operator is unable to provide a product to a user. The partner-operator product searcher 104A searches for a product that matches the requested condition among the products handled by a partner operator.

The option presenter 105A presents as options products that match the requested condition obtained by a search conducted by the product searcher 103A or the partner-operator product searcher 104A. In the second exemplary embodiment, if the product that matches the requested condition is not found in its operator or a partner operator, an alternative option is presented.

When a user has purchased a product handled by a partner operator through the website of the business operator of the reservation management server 5A, the product-arrangement recorder 106A records that the product selling has been arranged by its own operator.

In the second exemplary embodiment, this record is used for receiving a certain arrangement fee from a partner operator when a product handled by this partner operator is sold. The record is also used for providing a reward fee to a user in exchange for the purchase of a product of a partner operator. The reward fee to a user may be money or points.

The reward fee is granted to a user for the operational reason.

[Examples of Control Operation]

Figure 13:
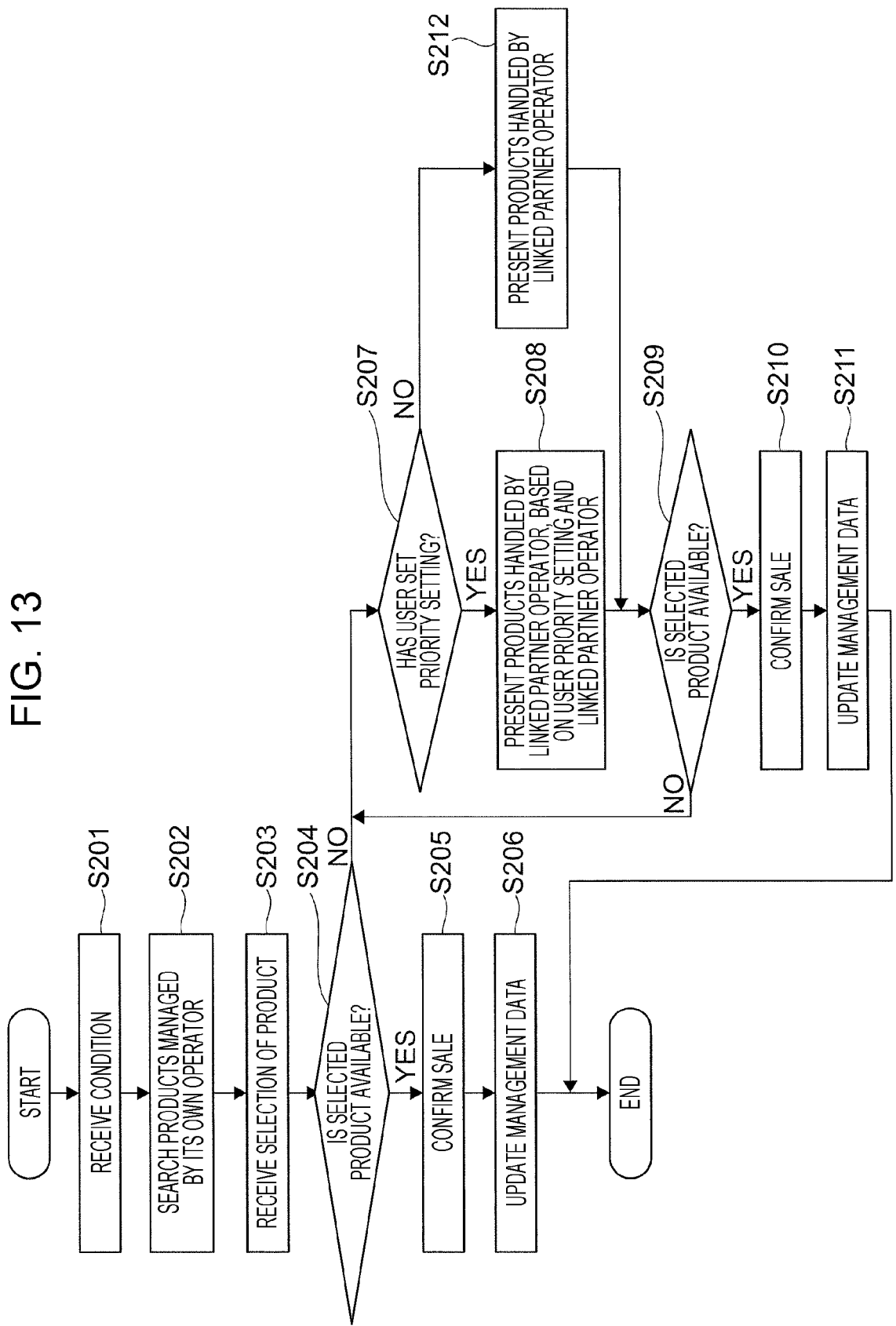
FIG. 13 is a flowchart illustrating an example of processing executed by a sales controller of a sales site (sales management server) accessed by a user.

FIG. 13 is a flowchart illustrating an example of processing executed by the sales controller 101A (see FIG. 12) of a sales site (sales management server) accessed by a user.

A description will be given below, assuming that the user has accessed the sales management server 5A1 (see FIG. 11) of company A1.

In step S201, the sales controller 101A receives a condition from the user. As the condition, a product name, for example, is input.

Then, in step S202, the sales controller 101A searches for a product that matches the input condition among the products handled by company A1. If multiple products that match the condition are found, the sales controller 101A presents them to the user as options. If the sales stock or the sales volume for a certain product is limited, the sales controller 101A may execute processing not to receive a purchase request for this product from another user when presenting options.

In step S203, the sales controller 101A receives selection of an option from the user.

Then, in step S204, the sales controller 101A judges whether the selected option is available. If the option is available (YES in step S204), the sales controller 101A confirms the sale in step S205 and updates management data in step S206.

If it is found that the selected option is not available (NO in step S204), the sales controller 101A proceeds to processing for searching for a product in a partner operator.

If it is found as a result of a search in step S202, that the product that satisfies the condition is not available, the sales controller 101A proceeds to step S204 by skipping step S203, and the result of step S204 becomes NO.

Before conducting a search, the sales controller 101A judges in step S207 whether the user has set a priority setting. The priority setting is a setting concerning which condition will be prioritized when presenting a partner operator. For example, the scheduled delivery date or time, price (including shipping charge), current condition of a product, and reputation of a partner operator are set in advance. If the user has set a priority setting (YES in step S207), in step S208, the sales controller 101A presents products handled by a linked partner operator as options, based on information concerning the user priority setting and the linked partner operator.

FIG. 14 illustrates an example of a management table (including information concerning priority settings) referred to by the sales controller 101A.

A management table 190 shown in FIG. 14 is an example of a table used by both of company A1 and company B1. The management table 190 includes plural fields 191 through 201.

The field 191 indicates a list of companies first accessed by a user. In FIG. 14, the sales company (sales management server 5A1 of company A1) first accessed by a user is indicated by the bold frame.

The field 192 is for a sales company linked with the sales company accessed by a user. In the example in FIG. 14, company B1 is linked with company A1, and company A1 is linked with company B1. If one company has plural partner operators, such plural partner operators are indicated in one column together or in different columns separately.

The field 193 is for information concerning the scheduled delivery date or time at which a product will be delivered. In the example in FIG. 14, an earlier date or time is indicated by a double circle, and the next earlier date or time is indicated by a triangle. Although in FIG. 14 information is represented by symbols, numeric values indicating the rating for the scheduled delivery date or time may be recorded. Numeric values indicating the scheduled delivery date or time may alternatively be recorded.

The field 194 is for the total price. The shipping charge may vary depending on the sales company. In FIG. 14, the lowest price including shipping charge is represented by a circle, and the next lowest price is represented by a cross mark.

The field 195 is for the current condition of a product. The field 195 is not necessary if a product is brand new, but is necessary when it has already been used. In FIG. 14, a product in a good condition is represented by a circle, and a product in a band condition is represented by a cross mark.

The field 196 is for the reputation. In FIG. 14, a company having the best reputation is indicated by a circle, and a company having the second best reputation is indicated by a triangle.

Items of information indicated in the fields 193 through 196 correspond to user priority settings.

The field 197 is for a portal-site operator to which the sales company first accessed by a user belongs. The field 198 is for a portal-site operator to which a linked partner sales company belongs. Information in the field 197 or 198 becomes necessary when a sales company is not a portal-site operator.

The fields 199 and 200 are for the arrangement fee. The field 199 is for the arrangement fee paid to a sales company, while the field 200 is for the arrangement fee to a portal-site operator.

The field 201 is for the reward fee paid to a user.

Referring back to FIG. 13, after step S208, the sales controller 101A judges in step S209 whether the presented option is available.

If the result of step S209 is NO, the sales controller 101A returns to step S207. The sales controller 101A presents another option by disregarding the priority setting, for example.

If the result of step S209 is YES, the sales controller 101A confirms the sale in step S210 and updates the management data in step S211.

If the user has not set a priority setting (NO in step S207), in step S212, the sales controller 101A presents products handled by a partner operator linked with company A1.

For example, by referring to the field 192 of the management table 190 (see FIG. 14), the sales controller 101A searches for products of one or plural partner operators that satisfy the requested condition and presents them to the user as options.

Upon completion of the sale of a product handled by a partner operator, company A1 may inform the partner operator that a product of the partner operator has been sold by the arrangement of company A1. Such information may be provided every time an arrangement is made or when a predetermined number of arrangements are made.

The arrangement fee may be settled every time an arrangement is made or the total arrangement fee for a month may be settled. The arrangement fee may be calculated based on contract conditions agreed upon with a partner operator.

[Screen Examples]

Examples of screens displayed on the user terminal 4 (see FIG. 1) operated by a user will be discussed below.

FIGS. 15A through 15E illustrate examples of screens displayed during a process of purchasing a product.

FIG. 15A illustrates a screen 211 for presenting products provided by a sales operator (company A1) as options. FIG. 15B illustrates a screen 212 for presenting products handled by a partner operator (company B1) as alternative options. FIG. 15C illustrates a screen 213 for presenting a product of a partner operator (company B1) selected by a user. FIG. 15D illustrates a screen 214 for making a purchase request. FIG. 15E illustrates a screen 215 when the purchase of a product has been completed.

The screen 211 in FIG. 15A is an example of a screen displayed when a user has provided only a product name as a condition.

The screen 212 in FIG. 15B shows a message that personal computer XXX requested by the user is not available and indicates alternative options found by a search conducted for a partner operator. In this example, company B1 is presented as a partner operator. If company A1 has plural partner operators, the positions of the partner operators in a list may be determined according to the arrangement fee or the matching degree. The matching degree is a degree representing how much the partner operator matches the requested conditions based on the user priority settings. Alternatively, the rating level may be calculated for each partner operator, and an operator having a higher rating level may preferentially be placed in a higher position in the list.

The screen 213 in FIG. 15C is a screen displayed when the user has selected "personal computer XXX" handled by company S1. When the user clicks "purchase screen", the screen 214 shown in FIG. 15D is displayed. In this example, the personal computer that matches the condition is presented as an option, and thus, when the user sends a purchase request on the screen 214, the screen 215 shown in FIG. 15E appears to inform the user of the completion of purchasing.

In this manner, the user is able to purchase a product handled by company B1 by accessing the sales site of company A1. The user does not even have to input the condition again.

According to the second exemplary embodiment, a user is able to preferentially search for products handled by company A1 by accessing their sales site and inputting a condition. Even when the product that matches the condition is not available in company A1, the user is able to purchase a product of company B1, which is a partner operator of company A1, through the sales site of company A1.

In the case of existing sales sites, not only products handled by partnership operators (company A1 and company B1), but also those by company C1, company D1, and company E1 are presented as options. Additionally, products of company A1, which most interest the user, are not necessarily placed in a higher position of a list of options. Products of, company C1, company D1, and company E1, which do not interest the user very much, are also presented as options.

In the second exemplary embodiment, however, products of company A1 are first presented as options, and if the product that matches a condition requested by a user is not available, the user is still able to purchase a product of company B1 which is likely to have a quality comparable to that of company A1.

Among companies (company A1 and company B1, for example) forming a partnership, the products of a certain company (company A1, for example) accessed by a user first are presented preferentially over those of the other companies, so that company A1 has more chances to sell products. Even when company A1 fails to provide a product to a user, the user is still able to purchase a product of a partner operator (company B1) through the sales site of company A1.

For a partner operator (company B1, for example), the opportunity to sell their products is increased through another partner operator (company A1, for example), so that company B1 is able to sell more products.

Third Exemplary Embodiment

The first exemplary embodiment has been discussed by assuming a reservation of a space 3. In a third exemplary embodiment, the selling of services is assumed.

[Overview of System]

Figure 16:
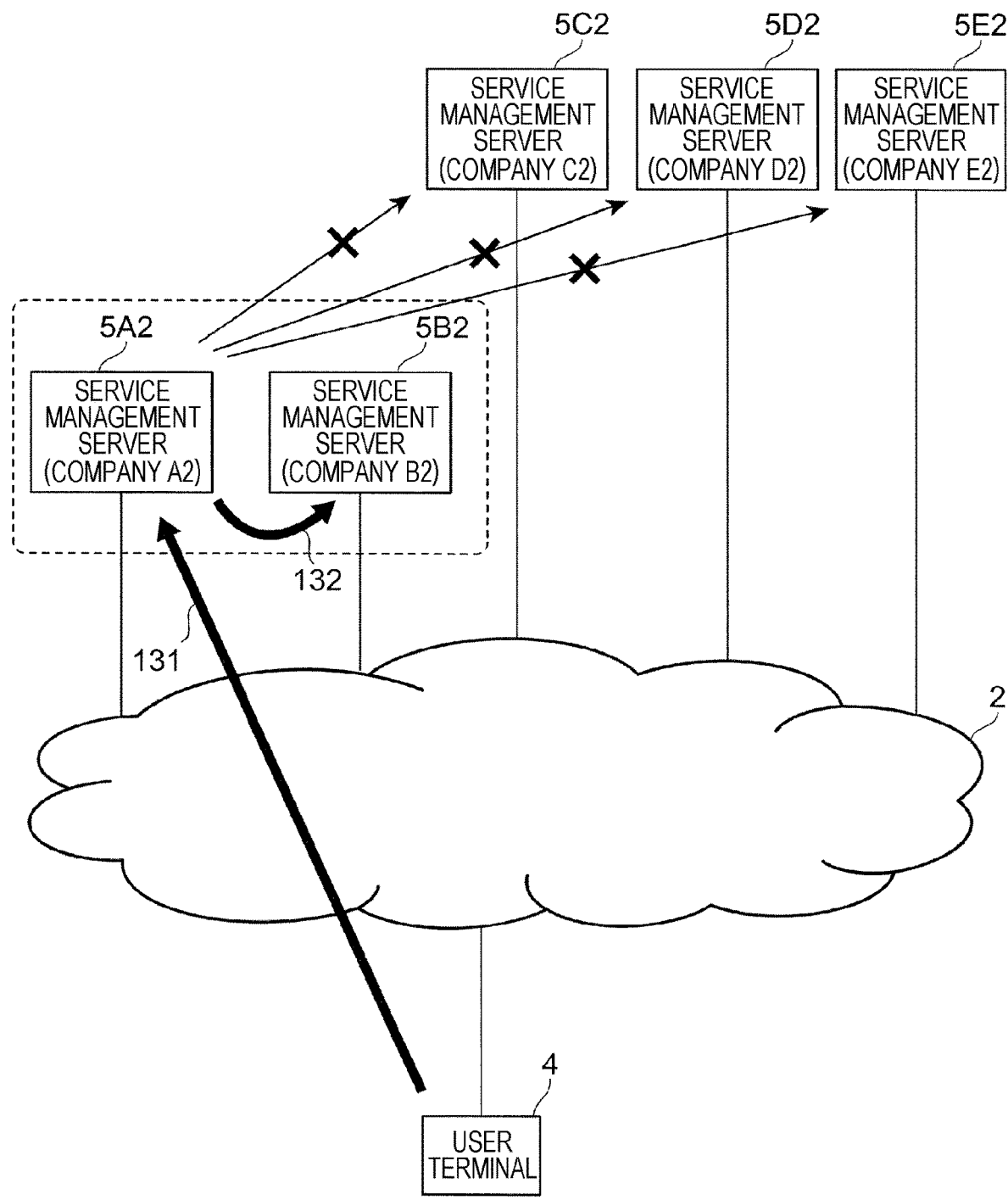
FIG. 16 illustrates how service selling is conducted in a third exemplary embodiment.

FIG. 16 illustrates how service selling is conducted in the third exemplary embodiment.

In FIG. 16, portions corresponding to those shown in FIG. 11 are designated by like reference numerals.

In the example in FIG. 16, terminals only related to service selling are shown. Five service management servers 5A2, 5B2, 5C2, 5D2, and 5E2 are shown. The service management servers 5A2, 5B2, 5C2, 5D2, and 5E2 correspond to company A2, company B2, company C2, company D2, and company E2, respectively, which operate service providing sites.

The service providing operators in the third exemplary embodiment may be service providers or be agents acting for selling services of specific service providers. A service provider may be a company or an individual.

In the third exemplary embodiment, examples of services are education services, such as English conversation classes, music school classes, preschool classes, and private classes, beauty services, such as beauty salons, barbers, hairdressers, medical services, such as hospitals, clinics, and health checkups, cleaning services, and various delivery services.

In the third exemplary embodiment, company A2 and company B2 form a partnership with each other, while company C2, company D2, and company E2 sell services independently.

In the third exemplary embodiment, "forming a partnership" means that service providing operators help each other out to provide a service that matches a requested condition to a user. More specifically, if a certain service providing operator receiving a request from a user is unable to provide a service that matches a requested condition, it recommends a service of a partner operator to the user.

In the third exemplary embodiment, a partner operator may be determined according to the service or according to the operator (may be a company or an individual).

In the case of a portal-site operator, it may use another portal-site operator as a partner operator or an individual provider acting for selling services as a partner operator.

In the example of FIG. 16, company A2 and company B2 help each other out to increase the opportunity to provide services.

In FIG. 16, it is assumed that a user has accessed a service providing site of company A2, as indicated by an arrow 131 heading from the user terminal 4 to the service management server 5A2.

In the third exemplary embodiment, the service management server 5A2 conducts a search for a service that matches a requested condition in two steps.

In the first step, the service management server 5A2 conducts a search among services provided by its own operator, that is, company A2. The user has first accessed the service providing site of company A2, and thus, the user most probably wishes to receive a service from company A2.

In the second step, the service management server 5A2 conducts a search among services provided by a partner operator, such as company B2. If company A2 is unable to provide a service to a user, it provides a similar service of a partner operator.

In this case, the user can purchase a service through the accessed site of company A2 without accessing the site of company B2 and inputting the requested condition again.

The user purchases a service of company B2 through company A2 and is thus likely to receive a service comparable to that provided by company A2.

An arrow 132 in FIG. 16 indicates the direction of the arrangement made from company A2 to company B2 when company A2 is unable to provide a service that matches a requested condition but company B2 is able to provide such a service.

The arrangement is not made from company A2 to company C2, company D2, or company E2 that does not have a partnership with company A2. Cross marks (X) are thus placed on the arrows from company A2 to company C2, company D2, and company E2.

[Configuration of Service Management Server]

An example of the configuration of the service management server 5A2 will be described below. The hardware configuration of the service management server 5A2 is similar to that shown in FIG. 4.

Figure 17:
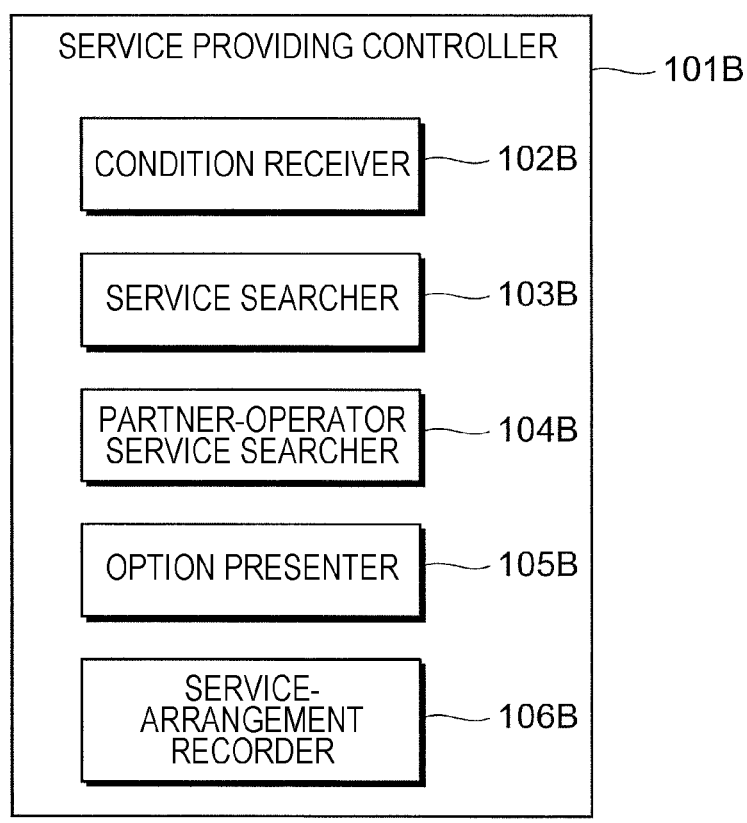
FIG. 17 is a block diagram illustrating an example of the software configuration of a CPU.

FIG. 17 is a block diagram illustrating an example of the software configuration of the CPU 51A (see FIG. 4).

In the third exemplary embodiment, the CPU 51A serves as a service providing controller 101B as a result of executing a program. The service providing controller 101B is an example of the presenter.

The service providing controller 101B includes multiple functions.

More specifically, the service providing controller 101B includes a condition receiver 102B, a service searcher 103B, a partner-operator service searcher 104B, an option presenter 105B, and a service-arrangement recorder 106B. The condition receiver 102B receives a condition from a user. The service searcher 103B preferentially searches for services provided by its own business operator over those provided by other operators. The partner-operator service searcher 104B searches for services provided by a partner operator when its own operator is unable to provide a service to a user. The option presenter 105B presents services that match a requested condition to a user as options. When a user has purchased a service provided by a partner operator, the service-arrangement recorder 106B records that the service selling has been arranged by its own operator.

The condition receiver 102B serves the function of receiving a condition from a user using the user terminal 4 (see FIG. 1).

The service searcher 103B searches for a service that matches a requested condition among the services provided by its own business operator.

The partner-operator service searcher 104B is a function to be used when its business operator is unable to provide a service to a user. The partner-operator service searcher 104B searches for a service that matches a requested condition among the services provided by a partner operator.

The option presenter 105B presents as options services that match the requested condition obtained by a search conducted by the service searcher 103B or the partner-operator service searcher 104B. In the third exemplary embodiment, if the service that matches the requested condition is not found in its operator or a partner operator, an alternative option is presented.

When a user has purchased a service provided by a partner operator through the website of the business operator of the reservation management server 5B, the service-arrangement recorder 106B records that the service selling has been arranged by its own operator.

In the third exemplary embodiment, this record is used for receiving a certain arrangement fee from a partner operator when a service provided by this partner operator is sold. The record is also used for providing a reward fee to a user in exchange for the purchase of a service of a partner operator. The reward fee to a user may be money or points.

The reward fee is granted to a user for the operational reason.

[Examples of Control Operation]

Figure 18:
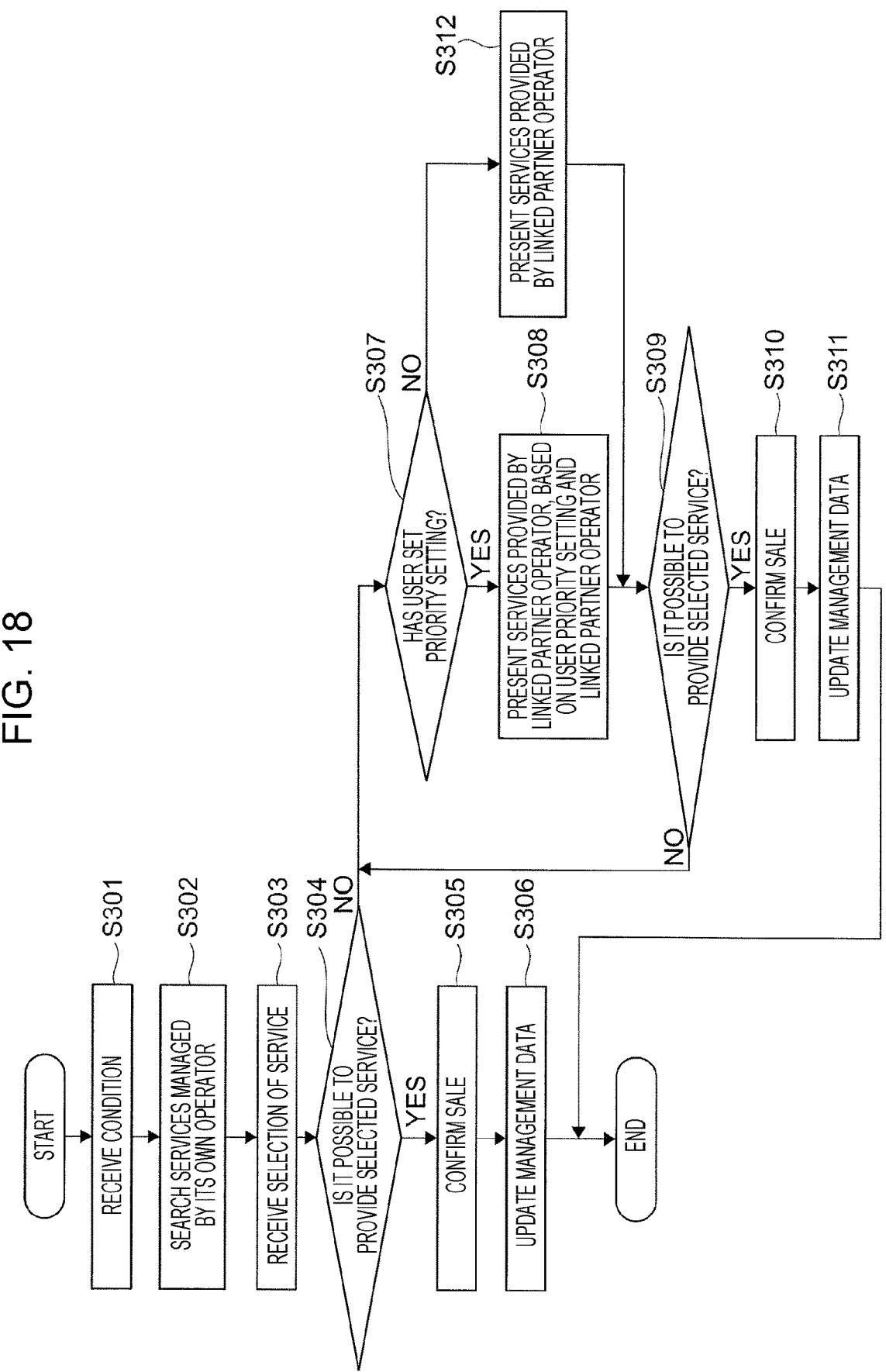
FIG. 18 is a flowchart illustrating an example of processing executed by a service providing controller of a service providing site (service management server) accessed by a user.

FIG. 18 is a flowchart illustrating an example of processing executed by the service providing controller 101B of a service providing site (service management server) accessed by a user.

A description will be given below, assuming that the user has accessed the service management server 5A2 (see FIG. 16) of company A2.

In step S301, the service providing controller 101B receives a condition from the user. As the condition, a service name, for example, is input.

In step S302, the service providing controller 101B then searches for a service that matches the input condition among the services provided by company A2. If multiple services that match the condition are found, the service providing controller 101E presents them to the user as options. If the number of users to receive such a service is limited, the service providing controller 101B may execute processing not to receive a purchase request for this service from another user when presenting options.

In step S303, the service providing controller 101B receives selection of an option from the user.

Then, in step S304, the service providing controller 101B judges whether the selected option can be provided. If it is not possible to provide the option (YES in step S304), the service providing controller 101B confirms the sale in step S305 and updates management data in step S306.

If it is found that it is not possible to provide the selected option (NO in step S304), the service providing controller 101E proceeds to processing for searching for a service in a partner operator.

If it is found as a result of a search in step S302 that the service that satisfies the condition is not available, the service providing controller 101B proceeds to step S304 by skipping step S303, and the result of step S304 becomes NO.

Before conducting a search, the service providing controller 101B judges in step S307 whether the user has set a priority setting.

The priority setting is a setting concerning which condition will be prioritized when presenting a partner operator. For example, the date or time at which a service can be provided, price (per session or per unit time), reputation of a partner operator, and the distance or time required to get to a place where a user receives a service are set in advance.

If the user has set a priority setting (YES in step S307), in step S308, the service providing controller 101B presents services provided by a linked partner operator as options, based on information concerning the user priority setting and the linked partner operator.

FIG. 19 illustrates an example of a management table (including information concerning priority settings) referred to by the service providing controller 101B.

A management table 230 shown in FIG. 19 is an example of a table used by both of company A2 and company B2. The management table 230 includes plural fields 231 through 241.

The field 231 indicates a list of service providing companies first accessed by a user. In FIG. 19, the service providing company (service management server 5A2 of company A2) first accessed by a user is indicated by the bold frame.

The field 232 is for a service providing company linked with the service providing company accessed by a user. In the example in FIG. 19, company B2 is linked with company A2, and company A2 is linked with company B2. If one company has plural partner operators, such plural partner operators are indicated in one column together or in different columns separately.

The field 233 is for information concerning the date or time at which the service can be provided. In the example in FIG. 19, an earlier date or time is indicated by a double circle, and the next earlier date or time is indicated by a triangle. Although in FIG. 19 information is represented by symbols, numeric values indicating the rating for the date or time may be recorded. Numeric values indicating the date or time may alternatively be recorded.

The field 234 is for the price. In FIG. 19, a lower price is represented by a circle, and a higher price is represented by a cross mark.

The field 235 is for the reputation. In FIG. 19, a company having a good reputation is indicated by a circle, and a company having a bad reputation is indicated by a cross mark.

The field 236 is for the distance or time required to get to a place where a service is provided. A field for the cost to travel from the position of a user to a place where a service is provided may also be disposed. In FIG. 19, the nearest distance or the shortest time is represented by a double circle, and the next nearest distance or the shortest time is represented by a circle.

Items of information indicated in the fields 233 through 236 correspond to user priority settings.

The field 237 is for a portal-site operator to which the company first accessed by a user belongs. The field 238 is for a portal-site operator to which a linked partner company belongs. Information in the field 237 or 238 becomes necessary when a service providing company is not a portal-site operator.

The fields 239 and 240 are for the arrangement fee. The field 239 is for the arrangement fee paid to a service providing company, while the field 240 is for the arrangement fee to a portal-site operator.

The field 241 is for the reward fee paid to a user.

Referring back to FIG. 18, after step S308, the service providing controller 101B judges in step S309 whether the presented option can be provided.

If the result of step S309 is NO, the service providing controller 101B returns to step S307. The service providing controller 101B presents another option by disregarding the priority setting, for example.

If the result of step S309 is YES, the service providing controller 101B confirms the sale in step S310 and updates the management data in step S311.

If the user has not set a priority setting (NO in step S307), in step S312, the service providing controller 101B presents services provided by a partner operator linked with company A2.

For example, by referring to the field 232 of the management table 230 (see FIG. 19), the service providing controller 101B searches for services of one or plural partner operators that satisfy the requested condition and presents them to the user as options.

Upon completion of the sale of a service provided by a partner operator, company A2 may inform the partner operator that a service provided by the partner operator has been sold by the arrangement of company A2. Such information may be provided every time an arrangement is made or when a predetermined number of arrangements are made.

The arrangement fee may be settled every time an arrangement is made or the total arrangement fee for a month may be settled. The arrangement fee may be calculated based on contract conditions agreed upon with a partner operator.

[Screen Examples]

Examples of screens displayed on the user terminal 4 (see FIG. 1) operated by a user will be discussed below.

FIGS. 20A through 20E illustrate examples of screens displayed during a process of purchasing a service.

FIG. 20A illustrates a screen 251 for presenting services provided by a service providing operator (company A2) as options. FIG. 20B illustrates a screen 252 for presenting services provided by a partner operator (company B2) as alternative options. FIG. 20C illustrates a screen 253 for presenting a service of a partner operator (company B2) selected by a user. FIG. 20D illustrates a screen 254 for making a purchase request. FIG. 20E illustrates a screen 255 when the purchase of a service has been completed.

The screen 251 in FIG. 20A is an example of a screen displayed when a user has provided only a service name as a condition. In the example in FIG. 20A, an English conversation class at a price of 2,000 yen per session is displayed as the condition.

The screen 252 in FIG. 20B shows a message that the service (English conversation class) requested by the user is not possible to provide and indicates alternative options found by a search conducted for a partner operator. In this example, company B2 is presented as a partner operator. If company A2 has plural partner operators, the positions of the partner operators in a list may be determined according to the arrangement fee or the matching degree. The matching degree is a degree representing how much the partner operator matches the requested conditions based on the user priority settings. Alternatively, the rating level may be calculated for each partner operator, and an operator having a higher rating level may preferentially be placed in a higher position in the list.

The screen 253 in FIG. 20C is a screen displayed when the user has selected a service provided by company B2. When the user clicks "purchase screen", the screen 254 shown in FIG. 20D is displayed. In this example, the service that matches the condition is presented as an option, and thus, when the user sends a purchase request on the screen 254, the screen 255 shown in FIG. 20E appears to inform the user of the completion of purchasing.

In this manner, the user is able to purchase a service provided by company B2 by accessing the service providing site of company A2. The user does not even have to input the condition again.

According to the third exemplary embodiment, a user is able to preferentially search for services provided by company A2 by accessing their service providing site and inputting a condition. Even when company A2 is unable to provide the service that matches the condition, the user is able to receive a service by company B2, which is a partner operator of company A1, through the site of company A2.

In the case of existing service providing sites, not only services provided by partnership operators (company A2 and company B2), but also those by company C2, company D2, and company E2 are presented as options. Additionally, services of company A2, which most interest the user, are not necessarily placed in a higher position of a list of options. Services of, company C2, company D2, and company E2, which do not interest the user very much, are also presented as options.

In the third exemplary embodiment, however, services of company A2 are first presented as options, and if company A2 is unable to provide the service that matches a requested condition, the user is still able to receive a service of company B2 which is likely to be comparable to that of company A2.

Among companies (company A2 and company B2, for example) forming a partnership, the services of a certain company (company A2, for example) accessed by a user first are presented preferentially over those of the other companies, so that company A2 has more chances to sell their services. Even when company A2 fails to provide a service to a user, the user is still able to purchase a service of a partner operator (company B2) through the site of company A2.

For a partner operator (company B2, for example), the opportunity to sell their services is increased through another partner operator (company A2, for example), so that company B2 is able to sell more services.

Other Exemplary Embodiments

The exemplary embodiments of the invention have been discussed above. However, the technical scope of the invention is not restricted to the exemplary embodiments. Various modifications and/or improvements may be made, and exemplary embodiments based on such modifications and improvements are also encompassed within the technical scope of the invention.

Figure 21:
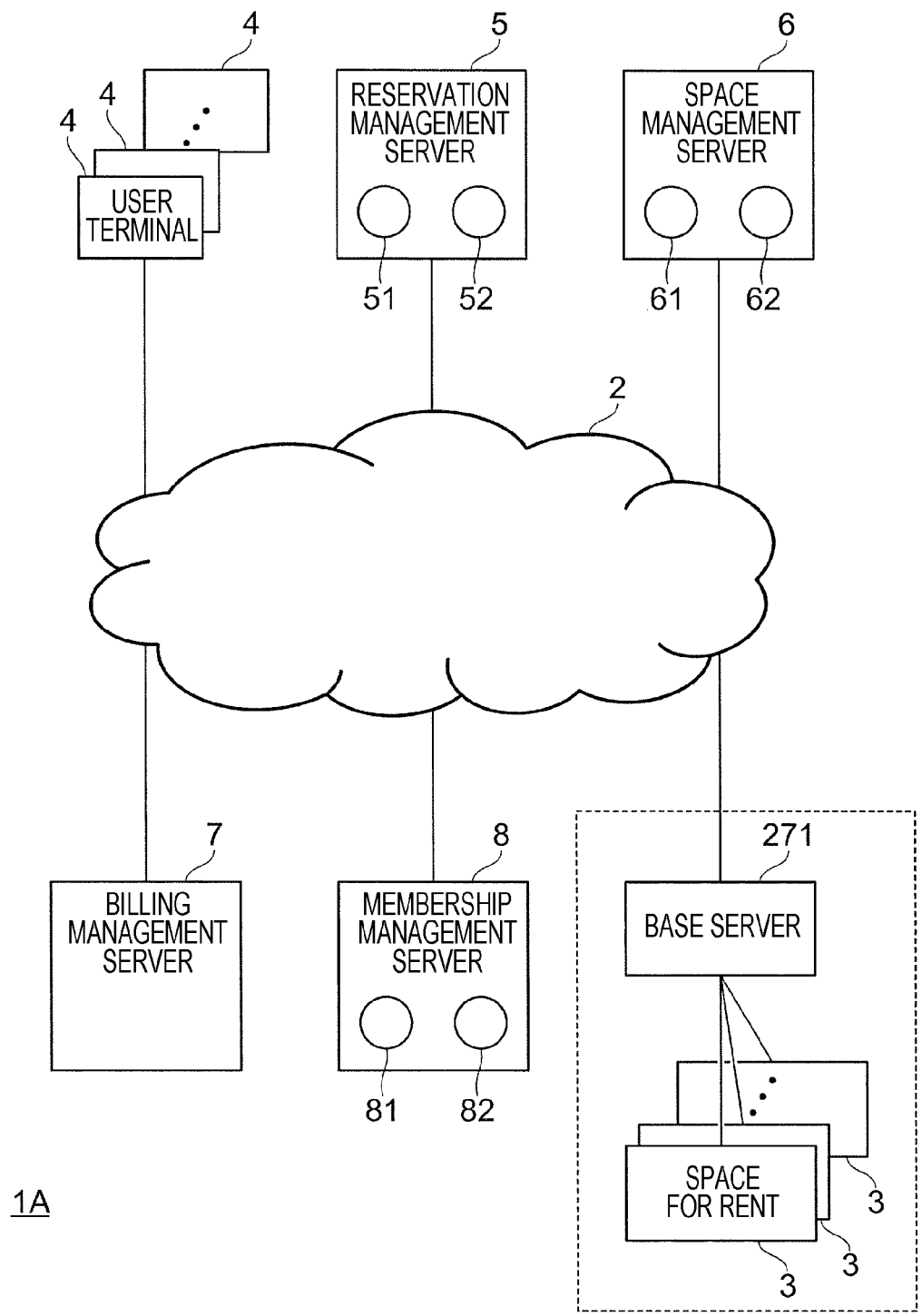
FIG. 21 schematically illustrates another example of the configuration of the management system.

The management system 1 (see FIG. 1) is not restricted to the above-described configuration. FIG. 21 schematically illustrates another example of the configuration of the management system 1, that is, the configuration of a management system 1A. In FIG. 21, elements corresponding to those in FIG. 1 are designated by like reference numerals. The management system 1A is different from the management system 1 in that a base server 271 is used for managing the plural spaces 3. The base server 271 configured as a computer may perform the functions of the reservation controller 101 (see FIG. 6) by executing a program. In this sense, the base server 271 is an example of the apparatus.

In the above-described first exemplary embodiment, a small room having a soundproof function, such as that shown in FIG. 2, is assumed as a space 3. However, meeting rooms, study rooms, and various types of guest rooms may be used as spaces 3 if reservations are required to be made for renting the spaces 3.

The first exemplary embodiment has been described, assuming that the door 32 can be locked. However, the above-described control function is still applicable when the door 32 is not possible to lock.

In the first exemplary embodiment, the spaces 3 are rented on a time basis. However, the spaces 3 may be rented based on another factor.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An apparatus comprising:
   a communication interface circuit, connecting the apparatus to a plurality of servers through a network;
   a memory, storing a management table that records collaborative information of the apparatus and the plurality of servers, and that records linkage information of products managed by the apparatus and products managed by the plurality of servers; and
   a processor, configured to:
      receive an input of a search condition from a user;
      perform a first search based on the search condition to generate a first result;
      in response to a determination that the first result does not satisfy a predetermined condition, the processor is further configured to:
         transmit a request to at least one second server among the plurality of servers to perform a second search, wherein the at least one second server is determined according to the collaborative information of the apparatus and the plurality of servers in the management table;
         receive a second result of the second search from the at least one second server, the second result comprising one or more products matching the search condition; and
         present to the user the one or more products in the second result;
      in response to determining that the first result satisfies the predetermined condition, the processor is further configured to present to the user one or more products in the first result without transmitting the request to the at least one second server to perform the second search.

2. The apparatus according to claim 1, wherein the products are spaces to be reserved.

3. The apparatus according to claim 2, wherein the spaces are spaces that allow a user to enter and leave by opening and closing a door.

4. The apparatus according to claim 2, wherein the spaces are enclosed by a wall.

5. The apparatus according to claim 1, wherein the products managed by the apparatus are linked with the products managed by the at least one second server in advance.

6. The apparatus according to claim 5, wherein a first product is selected by the user from among the one or more products included in the first result and that match the search condition.

7. The apparatus according to claim 1, wherein, the processor is configured to display a second among the one or more products included in the second result to the user in descending order of rating.

8. The apparatus according to claim 7, wherein, if the products are spaces to be reserved, a higher rating is given to an option for which a time taken to move from a current position of the user to a space, which is the second product, is shorter.

9. The apparatus according to claim 7, wherein, if the products are spaces to be reserved, a higher ating is given to an option for which a time taken to move from a space, which is a first product selected by the user, to a space, which is the second product, is shorter.

10. The apparatus according to claim 7, wherein, if the products are spaces to be reserved, a higher rating is given to an option for which an actual cost incurred to move to a space, which is the second product, is lower.

11. The apparatus according to claim 10, wherein the actual cost is a transportation cost to be paid by a user of the user.

12. The apparatus according to claim 10, wherein the actual cost is calculated as a difference between a reward fee granted to the user for using the second product and a transportation cost to be paid by the user.

13. The apparatus according to claim 7, wherein a higher rating is given to an option for which benefits from the use of the second product are higher.

14. The apparatus according to claim 1, wherein, if a condition is determined as a condition to be used in a case in which it is not possible to provide a first product, the processor selects a second product to be displayed as an option according to the condition.

15. The apparatus according to claim 14, wherein, if the products are spaces to be reserved and the first product is a selected space, the condition is a time taken for the user to move from the selected space to a space, which is the second product.

16. The apparatus according to claim 14, wherein, if the products are spaces to be reserved, the condition is an actual cost incurred to move to a space, which is the second product.

17. The apparatus according to claim 14, wherein, if the products are spaces to be reserved, the condition is benefits from the use of the second product.

18. A management system comprising:
   a first server; and
   a second server, wherein each of the first server and the second server includes a communication interface circuit, connecting the apparatus to a plurality of servers through a network, and a memory storing a management table that records collaborative information of the first and the second server, and that records linkage information of products managed by the first server and products managed by the second server,
   wherein the first server comprises a processor, configured to:
      receive an input of a search condition from a user;

perform a first search based on the search condition to generate a first result;

in response to a determination that the first result does not satisfy a predetermined condition, the processor is further configured to:

transmit a request to at least one second server among the plurality of servers to perform a second search, wherein the at least one second server is determined according to the collaborative information of the apparatus and the plurality of servers in the management table;

receive a second result of the second search from the at least one second server, the second result comprising one or more products matching the search condition; and present to the user the one or more products in the second result;

in response to determining that the first result satisfies the predetermined condition, the processor is further configured to present to the user one or more products in the first result without transmitting the request to the at least one second server to perform the second search.

\* \* \* \* \*